(12) United States Patent
Hanson et al.

(10) Patent No.: US 12,056,191 B2
(45) Date of Patent: *Aug. 6, 2024

(54) BITMAP FILTER, A METHOD OF GENERATING THE SAME, AND A METHOD OF USING A BITMAP FILTER TO PERFORM A JOIN

(71) Applicant: SingleStore, Inc., San Francisco, CA (US)

(72) Inventors: Eric Norman Hanson, San Francisco, CA (US); Michal Nowakiewicz, San Francisco, CA (US); Eric Boutin, San Francisco, CA (US)

(73) Assignee: Singlestore, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,305

(22) Filed: Apr. 3, 2023

(65) Prior Publication Data

US 2023/0237099 A1 Jul. 27, 2023

Related U.S. Application Data

(63) Continuation of application No. 17/113,628, filed on Dec. 7, 2020, now Pat. No. 11,645,336, which is a (Continued)

(51) Int. Cl.
*G06F 16/903* (2019.01)
*G06F 16/901* (2019.01)

(52) U.S. Cl.
CPC .... *G06F 16/90335* (2019.01); *G06F 16/9017* (2019.01)

(58) Field of Classification Search
None
See application file for complete search history.

(56) References Cited

U.S. PATENT DOCUMENTS 5,594,898 A  1/1997 Dalal et al.
6,957,222 B1  10/2005 Ramesh
(Continued)

FOREIGN PATENT DOCUMENTS

CN  102663116 A  9/2012
CN  105683956 A  6/2016
WO  2016174171 A1  11/2016

OTHER PUBLICATIONS

O'Neil, Elizabeth, Patrick O'Neil, and Kesheng Wu. "Bitmap index design choices and their performance implications." In 11th International Database Engineering and Applications Symposium (IDEAS 2007), pp. 72-84. IEEE, 2007. (Year: 2007).*

(Continued)

*Primary Examiner* — Uyen T Le
(74) *Attorney, Agent, or Firm* — EIP US LLP

(57) ABSTRACT

There is provided a method of using a bitmap filter to filter a data source as part of a join operation. A set bit at a bit location of the bitmap filter is associated with an entry of the data source that comprises an identifier that matches a filter parameter. A row identifier of a row in another data source that corresponds to the identifier is determined based on a sum of a number of bits set in bit locations that are between the bit location of the set bit associated with the entry of the data source and a bit location in the bitmap filter corresponding to a different, known, row identifier of a different row in the another data source. The row of the another data source corresponding to the determined row identifier is interrogated to obtain information defining the identifier that matches the filter parameter.

18 Claims, 23 Drawing Sheets

Related U.S. Application Data continuation of application No. 15/987,737, filed on May 23, 2018, now Pat. No. 10,896,225.

(56) References Cited

U.S. PATENT DOCUMENTS

| | | | |
|---|---|---|---|
| 7,689,630 | B1 | 3/2010 | Lam |
| 10,552,386 | B1 | 2/2020 | Peterson |
| 2003/0055832 | A1 | 3/2003 | Roccaforte |
| 2006/0117036 | A1 | 6/2006 | Cruanes et al. |
| 2007/0016637 | A1 | 1/2007 | Brawn et al. |
| 2008/0071781 | A1 | 3/2008 | Ninan et al. |
| 2008/0215556 | A1 | 9/2008 | Surna et al. |
| 2012/0303633 | A1 | 11/2012 | He et al. |
| 2016/0034587 | A1 | 2/2016 | Barber et al. |
| 2016/0299944 | A1 | 10/2016 | Isaacson et al. |
| 2018/0032528 | A1 | 2/2018 | Turner et al. |
| 2018/0075116 | A1* | 3/2018 | Nakamura .......... G06F 16/2237 |
| 2018/0121504 | A1 | 5/2018 | Bienert et al. |

OTHER PUBLICATIONS

Barber, Ronald, Guy Lohman, Ippokratis Pandis, Vijayshankar Raman, Richard Sidle, Gopi Attaluri, Naresh Chainani, Sam Lightstone, and David Sharpe. "Memory-efficient hash joins." Proceedings of the VLDB Endowment 8, No. 4 (2014): 353-364. (Year: 2014).*

Wu K, Otoo EJ, Shoshani A. Optimizing bitmap indices with efficient compression. ACM Transactions on Database Systems (TODS). Mar. 1, 2006;31(1):1-38. (Year: 2006).*

Wrembel, Robert, "Data Warehouse Performance—Selected Techniques and Data Structures", Poznan University of Technology, Institute of Computing Science, Poznan, Poland, First European Summer School, eBISS 2011, Paris, France, Jul. 3-8, 2011, Tutorial Lectures In: "Lecture Notes in Business Information Processing", Springer Berlin Heidelberg, DE, XP055613042, ISSN: 1865-1348, vol. 96, pp. 27-62.

Zhang et al., "HG-Bitmap Join index: A Hybrid GPU/CPU Bitmap Join Index Mechanism for OLAP", Oct. 13, 2013, International Conference on Computer Analysis of Images and Patterns, CAIP 2017: Computer Analysis of Images and Patterns, Lecture Notes in Computer Science; Lect.Notes Computer, Springer, Berlin, Heidelberg, pp. 23-36, XP047268418.

Polychroniou et al., "Rethinking SIMD Vectorization for In-Memory Databases", Proceedings of yhe 2015 ACM SIGMOD International Conference On Management Of Data, SIGMOD '15, May 31, 2015, pp. 1493-1508, XP055613029, New York, New York, USA.

"Multipoint Bitmap Filter for Large Volume Data Query Processing", Indian Journal of Science and Technology, vol. 10 (4), DOI: 10.17485/ijst/2017/v10i4/95982, Jan. 2017, 3 pages.

5 International Search Report and Written Opinion dated Aug. 23, 2019 for PCT Application No. PCT/US2019/033523.

Chinese Office Action dated Dec. 5, 2023 for Chinese Application No. 201980034201.4.

* cited by examiner

10

| ID | Date | Location | Name |
|---|---|---|---|
| ID1 | ID5 | | |
| ID2 | ID2 | | |
| ID3 | ID8 | | |
| ID4 | ID3 | | |
| ID5 | ID5 | | |
| ID6 | ID6 | | |
| ID7 | ID7 | | |
| ID8 | ID1 | | |
| ID9 | ID9 | | |
| ID10 | ID10 | | |
| ID11 | ID2 | | |
| ID12 | ID3 | | |
| ID13 | ID8 | | |
| ID14 | ID1 | | |
| ID15 | ID6 | | |
| ID16 | ID4 | | |
| ID17 | ID4 | | |
| ID18 | ID9 | | |

Arrows: $I_{10}$, $520_{a-r}$, $I_{14}$, $I_{16}$; 500; $540_{a-r}$

Figure 7

Reg A

Reg E

Reg B1

Reg B2

Reg D

Reg F

Reg G

BITMAP FILTER, A METHOD OF GENERATING THE SAME, AND A METHOD OF USING A BITMAP FILTER TO PERFORM A JOIN

CROSS-REFERENCE TO RELATED APPLICATIONS

This application is a continuation under 35 U.S.C. § 120 of U.S. application Ser. No. 17/113,628, filed Dec. 7, 2020, which is a continuation of U.S. application Ser. No. 15/987,737, filed May 23, 2018. Each of the above-referenced patent applications is incorporated by reference in its entirety.

BACKGROUND OF THE INVENTION

Field of the Invention

The present application relates to query processing in databases and, more specifically, methods and systems for increasing the efficiency of search queries and functions called on database systems.

Description of the Related Technology

As technologies advance, the amount of information stored in electronic form and the desire for real-time or pseudo real-time ability to search, organize and/or manipulate such information is ever increasing. Database management systems, sometimes also referred to as databases and data warehouses, are designed to organize data in a form that facilitates efficient search, retrieval or manipulation of select information. Typical database management systems allow a user to submit a "query" or call one or more functions in a query language for searching, organizing, retrieving and/or manipulating information that satisfies particular conditions.

Certain databases are designed in accordance with the star schema, in which a so-called fact table contains e.g. line items from orders, with keys to so-called dimension tables, that each describe attributes of the orders such as dates, customers, suppliers, parts etc. The Star Schema Benchmark (SSB) is a benchmark designed to measure transaction performance in data warehouse applications, in which the data are stored in fact and dimension tables. Database query execution logic for executing star join queries, like those in the SSB, conventionally relies heavily on hash joins and Bloom Filters, and applying results of the filter during column-store scans. It would be advantageous to reduce the time spent evaluating hash functions, disambiguating hash collisions, saving to hash tables and parsing hash table buckets. In addition, it would be advantageous to reduce the resources incurred in operating upon Bloom Filters.

SUMMARY

According to a first aspect of the present disclosure there is provided a computer-implemented method of generating a bitmap filter, the method comprising: receiving a filter parameter; querying a first data source associated with the filter parameter to identify at least one entry in the first data source with an identifier corresponding to the filter parameter; performing a first process, the first process comprising: identifying zero or one single bit location, of a plurality of bit locations in a bitmap filter, that corresponds to an identifier of an entry of the first data source corresponding to the filter parameter, wherein each identifier has a numerical value and the bit location is identified based on the numerical value of the corresponding identifier; assigning the single bit location to the identifier, such that there is one-to-one mapping between each identifier corresponding to the filter parameter and an assigned bit location in the bitmap filter; and setting a bit at the assigned bit location; and repeating the first process for another entry in the first data source with an identifier corresponding to the filter parameter.

The one-to-one mapping between each identifier and associated bit location is deterministic by nature and consequently avoids collisions, thereby reducing computational effort that is normally required to determine and evaluate hash collisions. The direct use of the numerical value of the identifier provides fast processing that is not slowed down by evaluation of hash functions and hash outputs. In addition, the one-to-one mapping ensures that the length of the bitmap filter is sufficient to cover identifiers of the first data source corresponding to the filter parameter, whilst not extending unnecessarily. The design logic and subsequent generation of the bitmap filter allows the extended bit vector to be stored in a cache memory of a computer and, thus, provide fast processing.

According to a second aspect of the present disclosure there is provided a computer-implemented method of using a bitmap filter generated by the method of the first aspect, the method comprising: filtering a data source using the bitmap filter, the filtering comprising: identifying a single bit location, of a plurality of bit locations in the bitmap filter, that corresponds to an identifier of an entry of the data source, wherein each identifier has a numerical value and the bit location is identified based on the numerical value of the corresponding identifier; assigning the single bit location to the identifier, such that there is one-to-one mapping between each identifier and an assigned bit location in the bitmap filter; identifying whether a bit at the assigned bit location is set; and outputting the entry of the data source when the bit is set; and repeating the filtering for another entry of the data source.

According to a third aspect of the present disclosure there is provided a computer-implemented method of using a bitmap filter generated by the first aspect, the method comprising: associating a set bit of the bitmap filter with an entry of a data source, wherein the set bit is located at a bit location within the bitmap filter; determining a row identifier of an associated row in another data source based on a sum of a number of bits set in bit locations between the bit location of the set bit associated with the entry of the data source and a bit location in the bitmap filter corresponding to a different, known, row identifier; interrogating the associated row of the other data source corresponding to the determined row identifier; and outputting information from the associated row of the other data source.

The one-to-one mapping of identifiers corresponding to a filter parameter to single bit locations within the bitmap filter enables the direct look-up to a specific row of another data source, that defines the identifier corresponding to the filter. The integer identifiers act as an index to an array of rows. In this way, simplified logic is used that does not require a hash function evaluation, or traversal of more than one row to perform a look up.

According to a fourth aspect of the present disclosure, there is provided a computer-implemented method of using an extended bit vector comprising a) a bitmap filter configured to implement one-to-one mapping of an identifier of an entry of a data source to a bit location within the bitmap filter and b) a plurality of counters of bits set in the bitmap filter, wherein each bit location of the bitmap filter is associated with one of the plurality of counters, the method comprising: associating a set bit of the bitmap filter with an entry of a data source, wherein the set bit is located at a bit location within the bitmap filter; determining a row identifier of an associated row in another data source based on a count of a counter associated with the bit location of the set bit, wherein the count of the counter is a sum of a number of set bits in bit locations between the bit location of the set bit associated with the entry of the data source and a bit location in the bitmap filter corresponding to a different, known, row identifier; interrogating the associated row of the other data source corresponding to the determined row identifier; and importing information from the associated row of the other data source into a result table.

The extended bit vector has dual functionality: (1) as a bitmap filter; and (2) as a mapping to facilitate database join. For (1) the bitmap filter is deterministic, so no false positives are generated. For (2) the extended bit vector effectively translates sparse identifiers to a set of dense identifiers. Use of a single structure to perform (1) and (2) reduces the amount of memory needed, which, in turn, allows the structure to be stored in cache memory for fast access using streamlined code.

According to a fifth aspect of the present disclosure there is provided a computer-implemented method of using an extended bit vector comprising a) a bitmap filter configured to implement one-to-one mapping of an identifier of an entry of a data source to a bit location within the bitmap filter and b) a plurality of counters, C1-Cn, of bits set in the bitmap filter, wherein each bit location of the bitmap filter is associated with one of the plurality of counters, C1-Cn, the method comprising: storing the bitmap filter in a first register, Reg E; storing a plurality of identifiers of a corresponding plurality of entries of a data source in a second register, Reg B1, wherein the plurality of identifiers is shifted based on a minimum identifier value defined by the bitmap filter; applying a first single instruction multiple data, SIMD, instruction to the second register, Reg B1, wherein the first SIMD instruction is applied to all the identifiers stored by the second register; generating, based on the application of the first SIMD instruction, data stored in a third register, Reg B2, wherein the third register, Reg B2, comprises a plurality of byte addresses of the bitmap filter corresponding to the second register, Reg B1; applying, a second SIMD instruction to the first register, Reg E, and the third register, Reg B2, wherein the second SIMD instruction is applied to all the identifiers stored by the first the third register; generating, based on the second SIMD instruction, data stored in a fourth register, Reg C, wherein the fourth register, Reg C, comprises a version of the first register, Reg E, corresponding to the byte addresses of Reg B2; applying, a third SIMD instruction to the second register, Reg B1, and the fourth register, Reg C, wherein the third SIMD instruction is applied to all the identifiers stored by the fourth register; generating, based on the third SIMD instruction, data stored in a fifth register, Reg D, wherein the fifth register, Reg D, identifies those identifiers of the second register, Reg B1, that are a match to the bitmap filter.

The design logic and subsequent generation of the extended bit vector allows the extended bit vector to be stored in a cache memory of a computer and, thus, provide fast processing. In addition, the SIMD implementation further reduces computational effort (number of cycles) whilst increasing query execution speed. Such parallel processing is particularly advantageous in achieving accelerated small probe actions within a probe phase of a join process, for example, probes into a small collection of rows resulting from the build phase of a join process. In one example, a small collection of rows may be small enough that a bitmap filter for the collection of build side rows can fit into a register set of a computer processor, for example, a single instruction multiple data (SIMD) register set.

BRIEF DESCRIPTION OF THE DRAWINGS

Various features of the present disclosure will be apparent from the detailed description which follows, taken in conjunction with the accompanying drawings, which together illustrate, features of the present disclosure, and wherein:

FIG. 7 is a schematic diagram of a data source, according to an example.

DETAILED DESCRIPTION OF CERTAIN EMBODIMENTS

A join process is a way of executing a query relating to data stored in a relational database. The join process has a build phase followed by a probe phase.

Figure 1A:
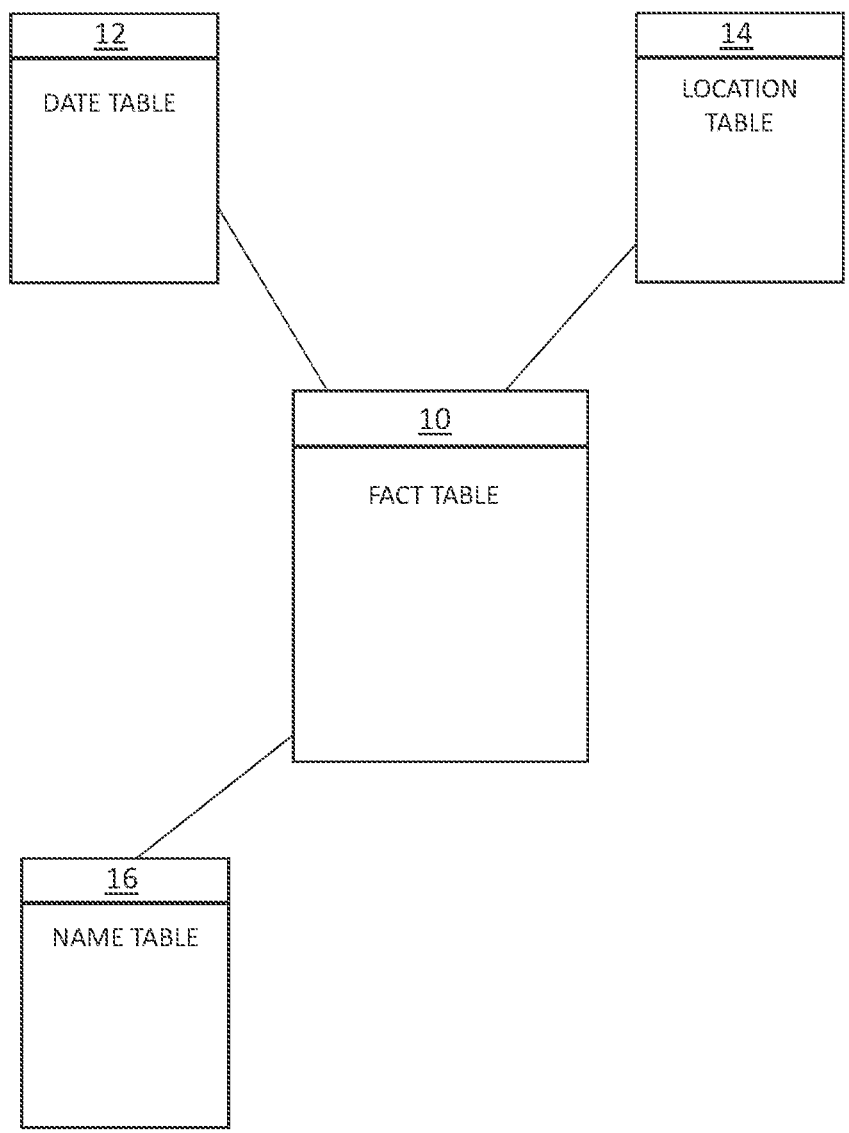
FIG. 1A is a schematic diagram of a star schema database, according to an example.

FIG. 1A shows a star schema database DB1 to which embodiments described herein have particular application. The database DB1 comprises a fact table 10 and three-dimension tables 12, 14, 16, relating to date, location, name respectively.

Each of the dimension tables 12, 14, and 16 may relate to conditions of a query and form the basis of a build phase of a join process. Accordingly, each of the dimension tables 12, 14 and 16 may be referred to as a build-side data source. As described in more detail later on, as part of the build phase a filter and mapping structure is generated based on a build-side data source and in accordance with conditions of the query.

The fact table 10 may be used as part of a probe phase of a join process. Accordingly, the fact table 10 may be referred to as a probe-side data source. During such a probe phase, a probe-side data source is interrogated so that the filter and mapping structure, generated in the build phase, is probed using the rows of the probe-side data source.

The Bitmap Generating Process (Build Phase)

Figure 1B:
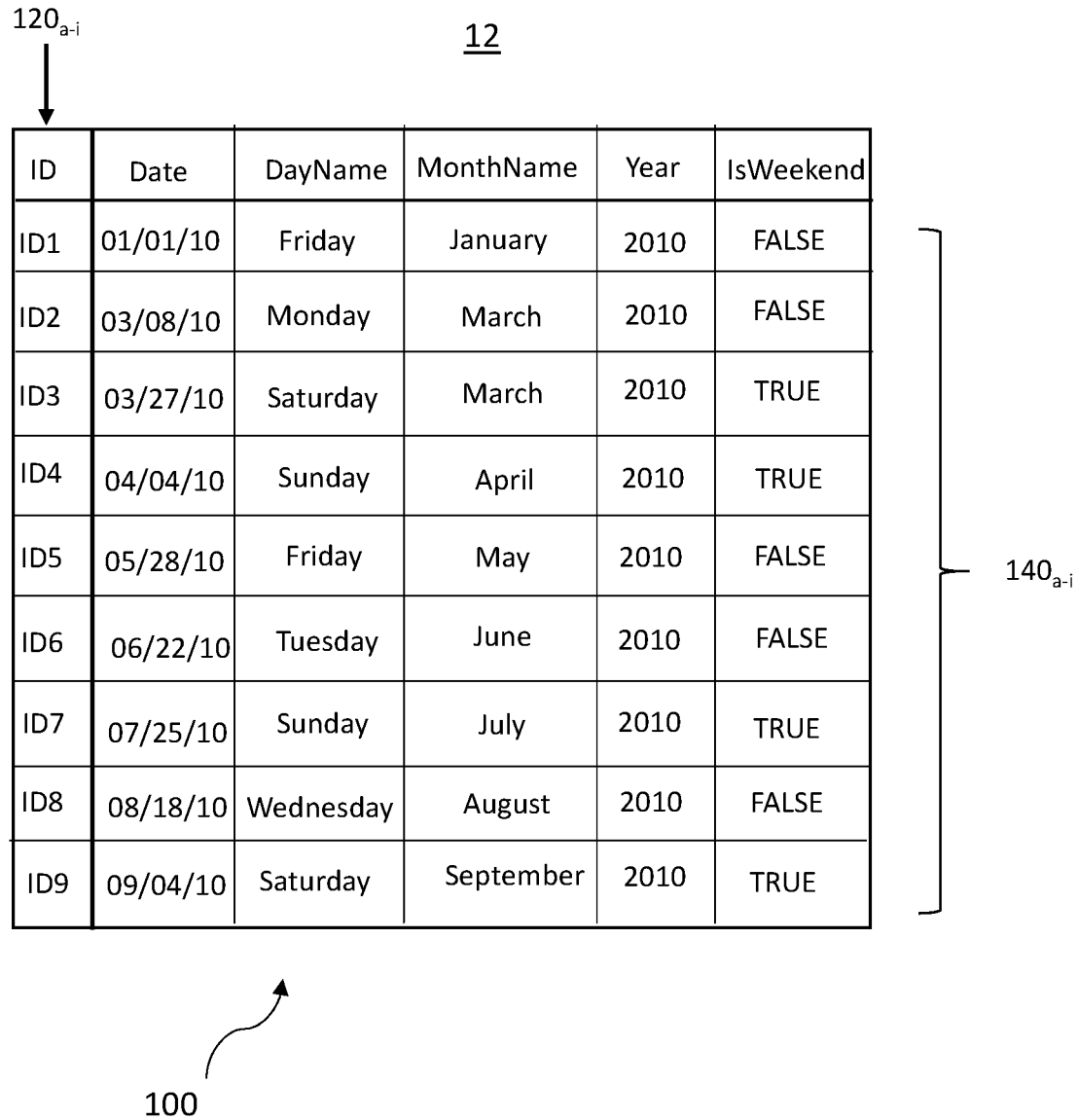
FIG. 1B is a schematic diagram of a data source, according to an example.

FIG. 1B shows data corresponding to one of the dimension tables 12 of FIG. 1A, to which embodiments described herein are applied. It is to be understood that embodiments apply to any of the dimension tables 12, 14, 16, and accordingly the data structure shown in FIG. 1B is referred to generically as a first data source 100. As shown in FIG. 1B, the first data source 100 has a plurality of entries $140_{a-i}$ each with a corresponding identifier $120_{a-i}$. Each of the identifiers $120_{a-i}$ identifies its corresponding entry so that the entries $140_{a-i}$ within the first data source 100 are differentiated from one another. For example, entry $140_a$ corresponds to identifier $120_a$, "ID1", and entry $140_b$ corresponds to identifier $120_b$, "ID2". ID1 is different to ID2 (and any other identifier of the first data source 100) so differentiates entry $140_a$ from any other entry $140_{b-i}$ of the first data source 100. This is the same for each identifier $120_{a-i}$ of the first data source 100. Each identifier $120_{a-i}$ may be unique within the first data source 100. In one example, each identifier $120_{a-i}$ may be a unique integer value. The integer value may be a single integer. Each identifier $120_{a-i}$ is a primary key of the associated entry $140_{a-i}$.

The first data source 100 may be a descriptive data source, where each entry $140_{a-i}$ defines its corresponding identifier $120_{a-i}$. In the example of FIG. 1B, dimension table 12 relates to date and entry $140_c$ contains the date "03/27/10", which defines the identifier $120_c$, ID3.

Figure 1C:
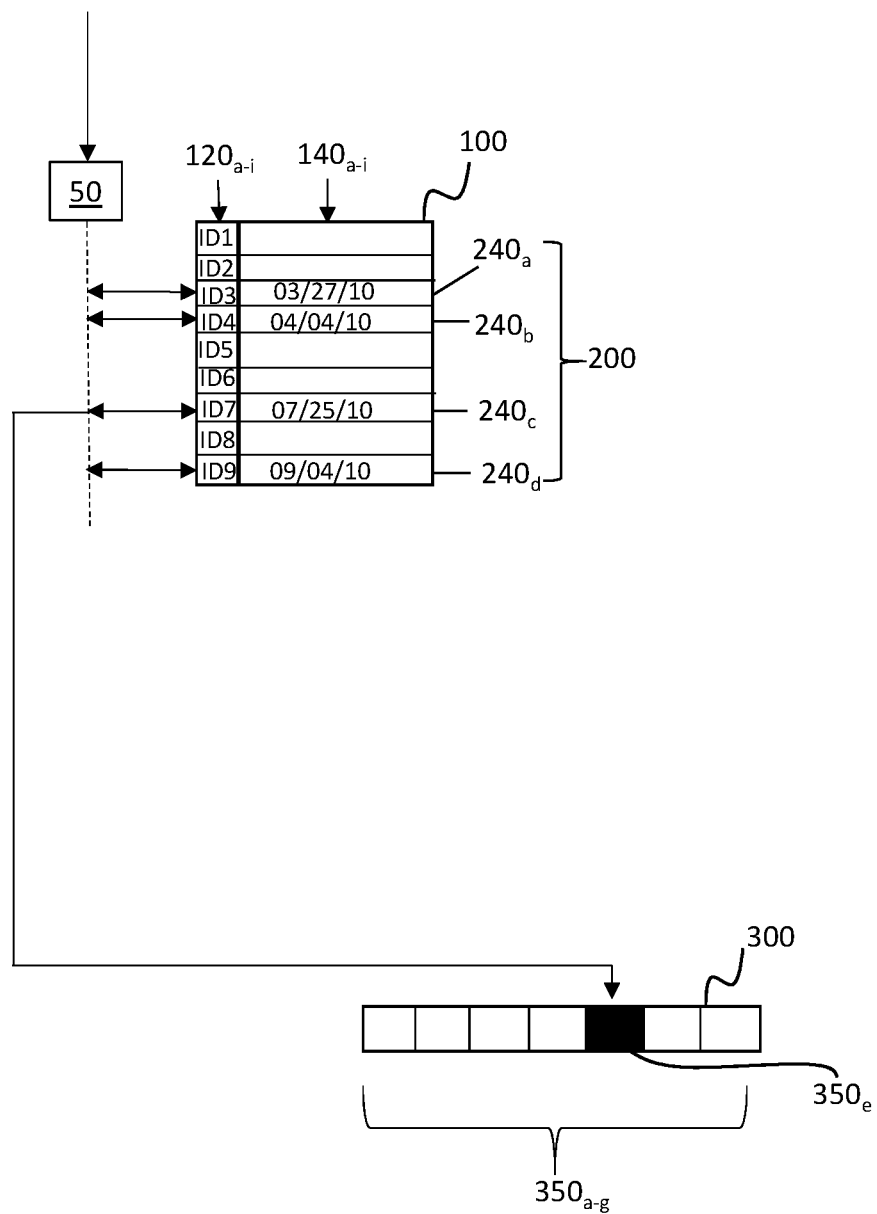
FIG. 1C is a schematic diagram of generating a bitmap filter, according to an example.

Referring to FIG. 1C, a filter parameter 50, associated with the first data source 100, is received and forms the basis of a query to the first data source 100 to identify at least one entry of the plurality of entries $140_{a-i}$ of the first data source 100 having an identifier $120_{a-i}$ corresponding to the filter parameter 50. Accordingly, the first data source can be regarded as a build-side data source.

In the example of FIG. 1C, the filter parameter 50 relates to weekends. Subsequently, entries of the data source 100 that correspond to weekends are identified as having identifiers corresponding to the filter parameter 50.

The entries of data source 100 having identifiers corresponding to the filter parameter 50 are identified as a subset 200 (entries $240_{a-d}$) of the entries $140_{a-i}$. Looking to the data source 100, the subset 200 comprises entries $240_{a-d}$ having identifiers $120_{c,d,g,i}$ (ID3, ID4, ID7, ID9) corresponding to the filter parameter 50. Entry $240_a$ has identifier $120_c$ and contains date "03/27/10", which is defined as a Saturday and therefore falling on a weekend (see FIG. 1B) and corresponding to the filter parameter 50, which related to weekends. This is the same for entries $240_{b-d}$ and their respective dates "04/04/10", "07/25/10", and "09/04/10". The identification of the subset is represented in FIG. 1C by the interaction of the double-headed arrows of each identifier and the dashed line extending from the filter parameter 50.

During a build phase, a bitmap filter 300 is generated by mapping identifiers $120_{a-i}$ of the first data source 100 corresponding to the filter parameter 50 (identifiers $120_{c,d,g,i}$) onto bit locations in a bitmap filter 300. The length of the bitmap filter is defined by a number of bit locations and minimum and maximum bit locations and is set by the identifiers that correspond to the filter parameter (that is, the identifiers of the subset 200), which avoids the bitmap filter being of unnecessary length. In one example, the length of the bitmap filter 300 may be determined by:

maximum identifier value− (minus) minimum identifier value+ (plus) 1 (one)

In the example of FIG. 1C, the maximum identifier value is 9 from "ID9". The minimum identifier value is 3 from "ID3".

Thus, the length of the bitmap filter 300 is:

9−3+1=7 bit locations

As shown in FIG. 1C, the bitmap filter 300 in this example has seven bit locations $350_{a-g}$. Each identifier $120_{a-i}$ has a numerical value and the location $350_{a-g}$ in the bitmap 300 is identified based on the numerical value of the corresponding identifier $120_{a-i}$. It will be appreciated that in general, zero or more bit locations of the plurality of bit locations $350_{a-g}$ in the bitmap filter 300 may be identified.

In this example, single bit location $350_e$ is assigned to the identifier $120_g$, meaning that identifier ID7 of entry $240_c$ is assigned to bitmap location $350_e$ of the bitmap 300.

Following the assignment of the bit location $350_e$, a bit at the assigned bit location $350_e$ is set (represented in FIG. 1C by the filled-in block at bit location $350_e$ of the bitmap 300). Setting the bit at bit location $350_e$ sets the bit value to binary 1.

The identification, assignment and bit setting processes, described above, can be referred to collectively as a first process. The first process is repeated for another entry $240_{a,b,d}$ within the subset 200 of the first data source 100. As an example, the first process may be repeated for the identifier $120_i$ of entry $240_d$.

To generate a complete bitmap filter 300 associated with the filter parameter 50, the first process is repeated for all the entries of the subset 200 of the first data source 100, resulting in the bitmap filter 300 having a set bit assigned to each bit location $350_{a-g}$ corresponding to each identifier $120_{a-i}$ of an entry ($240_{a-d}$) within the subset 200 of the first data source 100, and thereby corresponding to the filter parameter 50.

A bitmap filter, such as bitmap filter 300, generated by one-to-one mapping between each relevant identifier and associated bit location is deterministic by nature and consequently avoids collisions, thereby reducing computational effort that is normally required to determine and evaluate hash collisions.

Figure 2:
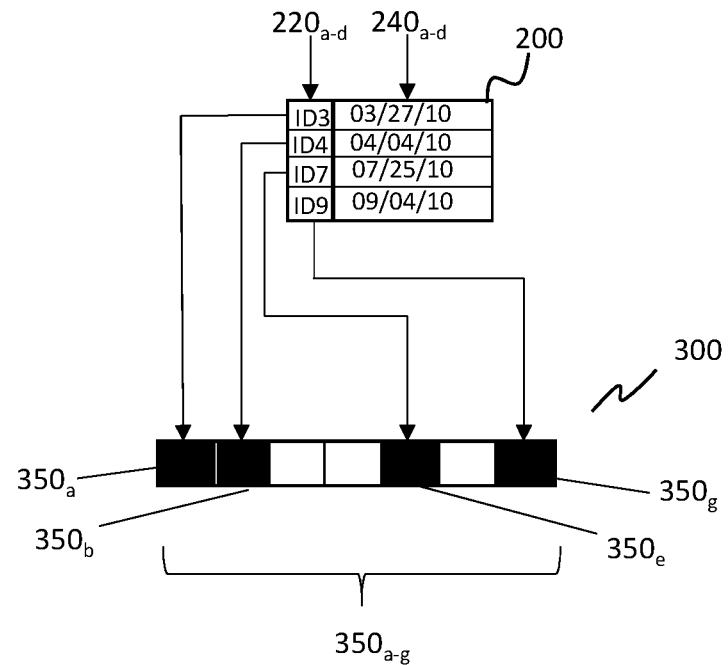
FIG. 2 is a schematic diagram of generating a bitmap filter, according to an example.

FIG. 2 is a schematic diagram of a bitmap filter 300 generated according to the subset 200 of the data source 100. Each entry $240_{a-d}$ of the subset 200 has an associated identifier $220_{a-d}$ and is mapped to a bit location in the bitmap filter 300. The identifiers $220_{a-d}$ of the subset 200 correspond to identifiers within the first data source 100 associated with the entries $240_{a-d}$. In this example, ID3 maps to bit location $350_a$, ID4 maps to bit location $350_b$, ID7 maps to bit location $350_e$, and ID9 maps to bit location $350_g$.

As explained above, the bitmap filter 300 is generated using one-to-one mapping between each identifier (in this example: ID3, ID4, ID7, ID9) corresponding to the filter parameter 50 and an assigned bit location $350_{a-g}$ in the bitmap filter 300. The one-to-one mapping ensures that the length of the bitmap filter 300 is sufficient to cover integer values associated with the subset 200 of entries of the first data source 100 corresponding to the filter parameter 50, whilst not extending unnecessarily.

As an example, the one-to-one mapping results in the minimum integer value of an identifier corresponding to a received filter parameter mapping to the first bit location of the bitmap and the maximum integer value of an identifier corresponding to a received filter parameter mapping to the last bit location of the bitmap. Referring to FIG. 2, the minimum value identifier "ID3" maps to the first bit location $350_a$ of the bitmap filter 300 and the maximum value identifier "ID9" maps to the last bit location $350_g$.

Figure 3:
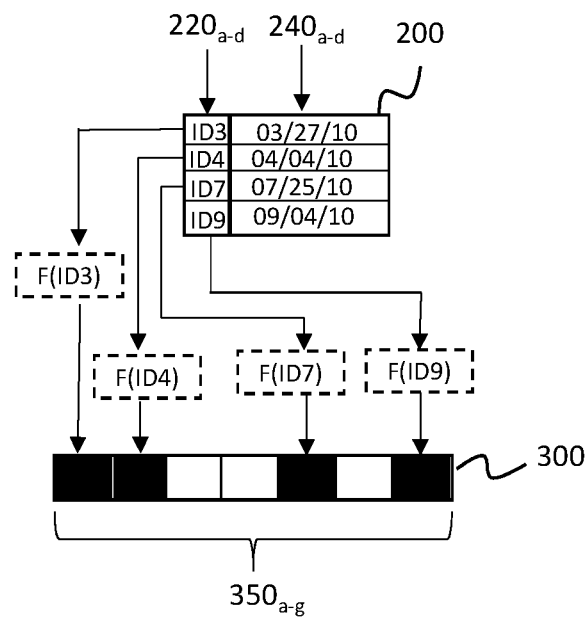
FIG. 3 is a schematic diagram of generating a bitmap filter, according to an example.

Identification of a single bit location $350_{a-g}$ that corresponds to each identifier $120_{a-i}$ of a subset 200 of entries of the first data source 100 corresponding to the filter parameter 50 can be achieved through application of a function to the numerical value of the identifier $120_{a-i}$, such that execution of the function generates the single bit location $350_{a-g}$ directly from the numerical value of the identifier $220_{a-i}$. FIG. 3 is a schematic illustration of the application of such a function. The dashed boxes illustrate the application of a function, F, directly on to each of the identifiers. For example, "F(ID3)" represents an application of the function F on the numerical value "3" of the identifier ID3, $220_a$. The direct use of the numerical value in this way replaces the need the evaluate a hash function, compare hash outputs to ensure no collisions, and store hashed values.

In the example of FIG. 3, execution of the function F shifts the numerical value of each of the identifiers $220_{a-d}$ by a predetermined amount. For example, a minimum value identifier of the entries $240_{a-d}$ of the subset 200 can be subtracted from the numerical value of each of the identifiers $220_{a-d}$, and the resulting value then normalized by the addition of a numerical value of 1 so that the bit location is within the length of the bitmap filter 300.

This can be generalized as:

numerical value of identifier− (minus) numerical value of the minimum value identifier+ (plus) 1 (one)=bit location In the current example, the minimum value identifier of entries $240_{a-d}$ of the subset 200 is "ID3", with a numerical value of 3. Accordingly, to identify the single bit location $350_{a-g}$ that corresponds to identifier ID4, the function determines the following:

4−3+1=2

In this way ID4 maps to the second bit location, that is bit location $350_b$ within the bitmap filter 300.

Figure 4A:
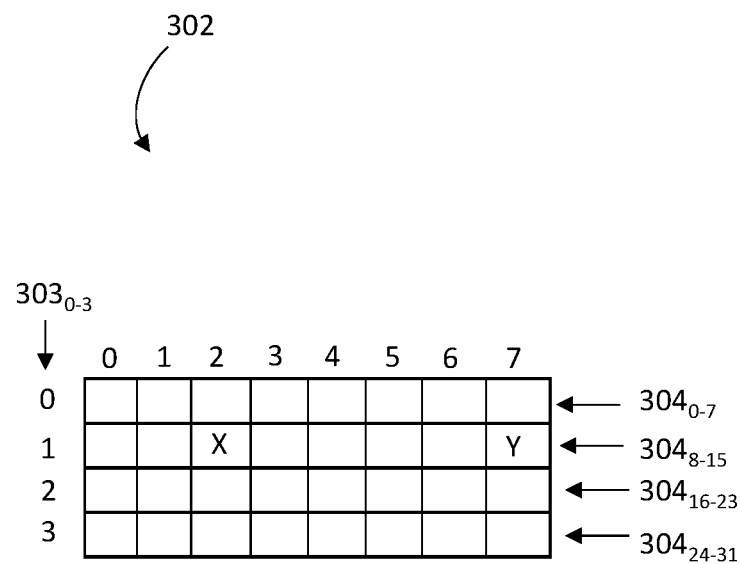
FIG. 4A is a schematic diagram of a bitmap filter, according to an example.
Figure 4B:
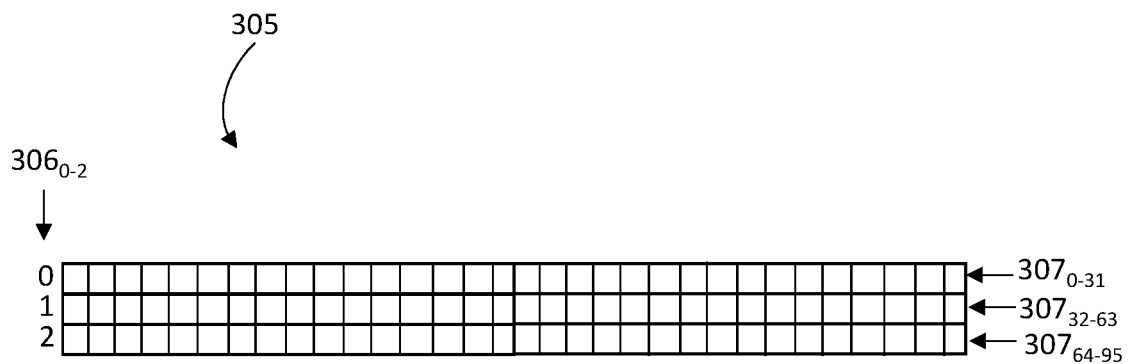
FIG. 4B is a schematic diagram of a bitmap filter, according to another example.

One-to-one mapping between identifier values and bit locations of the bitmap filter can also be achieved when a bitmap filter has a different format to the bitmap filter 300. FIGS. 4A and 4B provide examples of other bitmap filters 302 and 305 without showing whether the bits are set with a binary value of 1 or not set with a binary value 0; however, consistent with the previous discussion, the first and last bit locations of each bitmap would have set bits, corresponding to the minimum bit and maximum bit, respectively. In this way, the bitmap filters 302 and 305 are not unnecessarily long. In an example where a subset of entries that correspond to a filter consists of a single entry, the minimum and maximum bits of a bitmap filter, generated as previously discussed, would be the same bit, at a single bit location.

FIG. 4A illustrates a bitmap filter 302 stored as a plurality of bytes $303_{0-3}$. Each byte of the bitmap filter 302 is associated with a subset of bit locations of the bitmap filter 302. In this example, each byte is associated with 8-bit locations. For example, byte $303_0$ is associated with bit locations $304_{0-7}$, byte $303_1$ is associated with bit locations $304_{8-15}$, byte $303_2$ is associated with bit locations $304_{16-23}$, and byte $303_3$ is associated with bit locations $304_{24-31}$. In the example of FIG. 4A, to identify and assign a bit location of the bitmap filter 302 to an identifier of a data source a function may be used that, when executed, identifies a byte address of the bitmap filter 302 and a bit address within the identified byte based on the numerical value of the identifier, wherein the byte address and the bit address identify a single bit location within the bitmap filter 302.

In relation to FIG. 4A, the function may be a modulo function that generates (1) a quotient by dividing a numerical value of an identifier by the number of bit locations associated with each byte, which identifies the byte number; and (2) a remainder, which identifies the bit number within the identified byte. In the context of a zero-based bit numbering system 0-7 and the zero-based byte numbering system, the modulo function can be generalized as:

$$\frac{\text{numerical value of identifier} - \text{minimum value identifier}}{\text{no. of bit locations associated with each byte}} = \text{quotient, remainder}$$

In another example, a bit numbering system of 1-8 may be used, in which case, a function used to identify and assign a bit location to an identifier of a data source may be a modulo function that adds 1 to both the quotient value and the remainder value.

For the bitmap filter 302, the modulo function applied to an identifier value of 11, where the minimum value identifier is 1, would be as follows:

$$\frac{11-1}{8} = 1, 2$$

The quotient is 1, so identifies byte $303_1$. The remainder is 2 so identifies bit $304_{10}$ within byte $303_1$. This bit location is marked by an "X" in FIG. 4A.

In another example, for the bitmap filter 302, the modulo function applied to an identifier value of 16, where the minimum value identifier is 1, would be as follows:

$$\frac{16-1}{8} = 1, 7$$

The quotient is 1, so identifies byte $303_1$. The remainder is 7 so identifies bit $304_{15}$ within byte $303_1$. This bit location is marked by a "Y" in FIG. 4A.

In a further example illustrated by FIG. 4B, a bitmap filter 305 may be split into a plurality of words $306_{0-2}$, where each word is associated with a plurality of bit locations. In bitmap filter 305 each word $306_{0-2}$ is 32 bits long such that a first word $306_0$ of the bitmap filter 305 is associated with bit locations $307_{0-31}$, a second word $306_1$ of the bitmap filter 304 is associated with bit locations $304_{32-63}$, and a third word $306_2$ of the bitmap filter 305 is associated with bit locations $304_{64-9}$. In the example of FIG. 4B, to identify and assign a bit location of the bitmap filter 305 to an identifier of a data source a function may be used that, when executed, identifies a word of the bitmap filter 305 and a bit address within the identified word based on the numerical value of the identifier, wherein the word and the bit address identify a single bit location within the bitmap filter 305. In another example, each word may be 16 bits or 64 bits.

For the bitmap filter 305, with a zero-based word numbering system 0-2 and a zero-based bit numbering system 0-31, a modulo function can be used in a similar way as described for the bitmap filter 302, where the quotient identifies a word within the bitmap filter 305 and the remainder identifies a bit within the identified word:

$$\frac{\text{numerical value of identifier} - \text{minimum value identifier}}{\text{length of word}} = \text{quotient, remainder}$$

Figure 5:
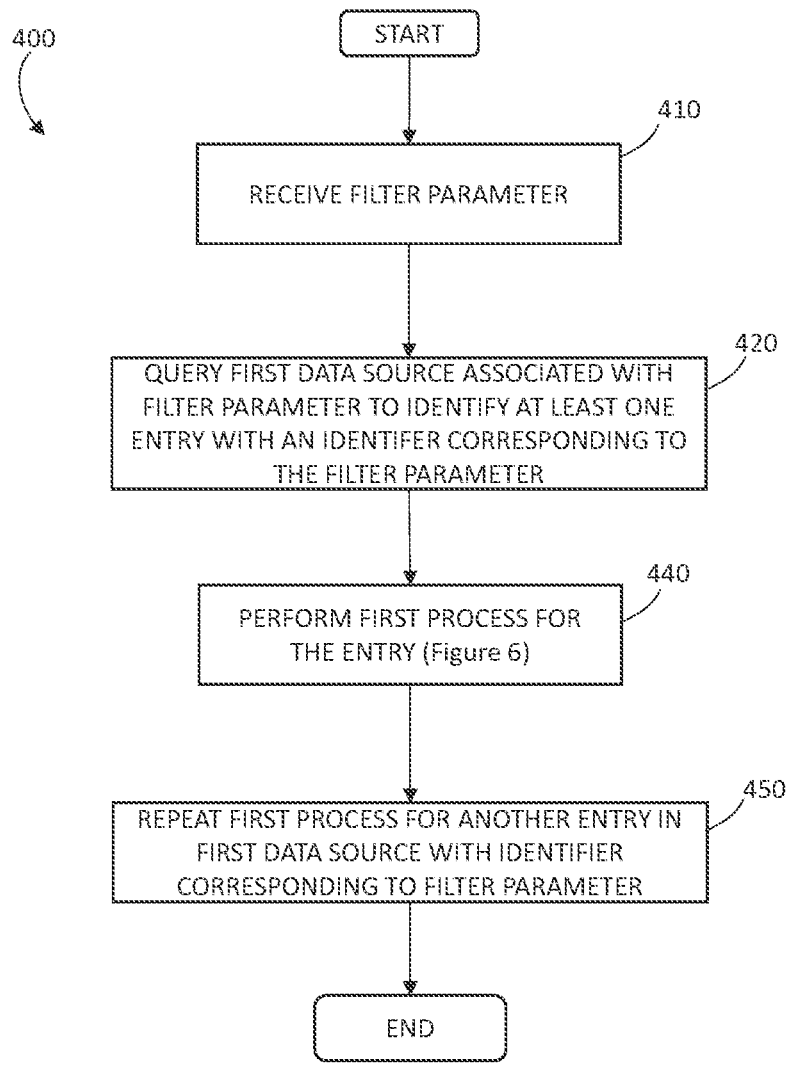
FIG. 5 is a flowchart of a method of generating the bitmap filter of FIG. 1, according to an example.

FIG. 5 is a flowchart of a method 400 of generating a bitmap filter 300 of FIGS. 1-3. The method 400 starts at block 410 where a filter parameter 50 is received. Next, the method 400 proceeds to block 420 where a first data source 100 associated with the filter parameter 50 is queried to identify at least one entry $240_{a\text{-}d}$ in the first data source 100 with an identifier $120_{a\text{-}i}$ corresponding to the filter parameter 50. Following this querying, at block 440, a first process involving identification, assignment and bit setting is performed for the entry. Following the first process, at block 450, the first process is repeated for another entry $240_{a,b,d}$ in the first data source 100 with an identifier $120_{a\text{-}i}$ corresponding to the filter parameter 50. Preferably the process is repeated for all such entries.

Figure 6:
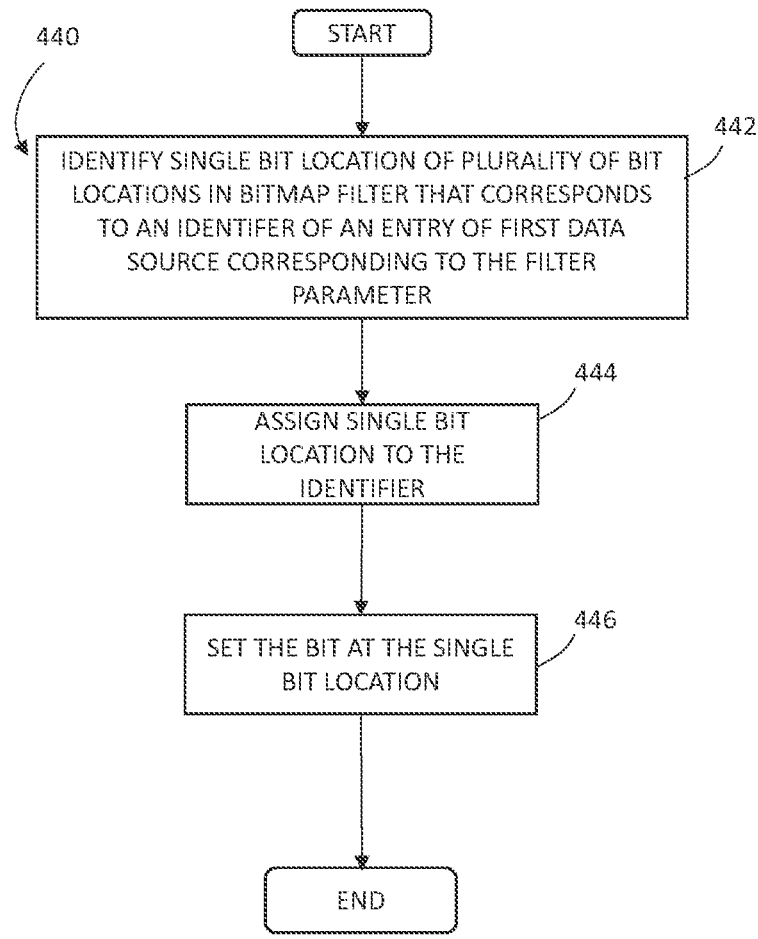
FIG. 6 is a flowchart of the method of generating a bitmap filter of FIG. 5, according to another example.

Referring to FIG. 6 and referring also to FIG. 1C, the first process of block 440 starts at block 442 where a single bit location $350_{a\text{-}g}$ of a plurality of bit locations $350_{a\text{-}g}$ in a bitmap filter 300 is identified that corresponds to an identifier $120_g$ of an entry $240_c$ of the first data source 100 corresponding to the filter parameter 50. As discussed earlier, each identifier $120_{a\text{-}i}$ has a numerical value and the bit location $350_{a\text{-}g}$ is identified based on the numerical value of the corresponding identifier $120_{a\text{-}i}$.

The method then proceeds to block 444 where the single bit location $350_e$ is assigned to the identifier $120_g$, such that there is one-to-one mapping between each identifier $120_{a\text{-}i}$ corresponding to the filter parameter 50 and an assigned bit location $350_{a\text{-}g}$ in the bitmap filter 300. After the assignment, at block 446, a bit at the assigned bit location $350_e$ is set.

The Filtering Process (Probe Phase)

FIG. 7 is a schematic diagram of a data source 500. The data source 500 corresponds to the fact table 10 of database DB1 in FIG. 1. The data source 500 of FIG. 7 has a plurality of entries $540_{a\text{-}r}$ each containing an identifier $520_{a\text{-}r}$. Each identifier $520_{a\text{-}r}$ is defined within a different data source—in this example, each identifier $520_{a\text{-}r}$ is a date identifier and is therefore defined within the dimension table 12, relating to date. Each identifier $520_{a\text{-}r}$ of the data source 500 is referred to as a foreign key that uniquely identifies an entry of a different data source, which is to say, an entry in the date dimension table 12. As such, the data source 500 may contain more than one of the same identifier $520_{a\text{-}r}$ in different entries of the plurality of entries $540_{a\text{-}r}$. For instance, in this example the identifier $520_a$ associated with entry $540_a$ is the same as the identifier $520_e$ associated with the entry $520_e$; both are ID5.

Since the data source 500 is a fact table, each entry of the plurality of entries $540_a$-r will also contain other identifiers defined by a data source other than the dimension table 12. In this example, data source 500 also contains identifiers associated with dimension table 14 (generally referred to as $I_{14}$) and a plurality of identifiers associated with dimension table 16 (generally referred to as $I_{16}$). Each entry of the plurality of entries $540_{a\text{-}r}$ is defined by an identifier of the plurality of identifiers, generally referred to as ho. Accordingly, the data source 500 can be regarded as a probe-side data source.

In another example, the data source 500 may be a dimension table.

Figure 8:
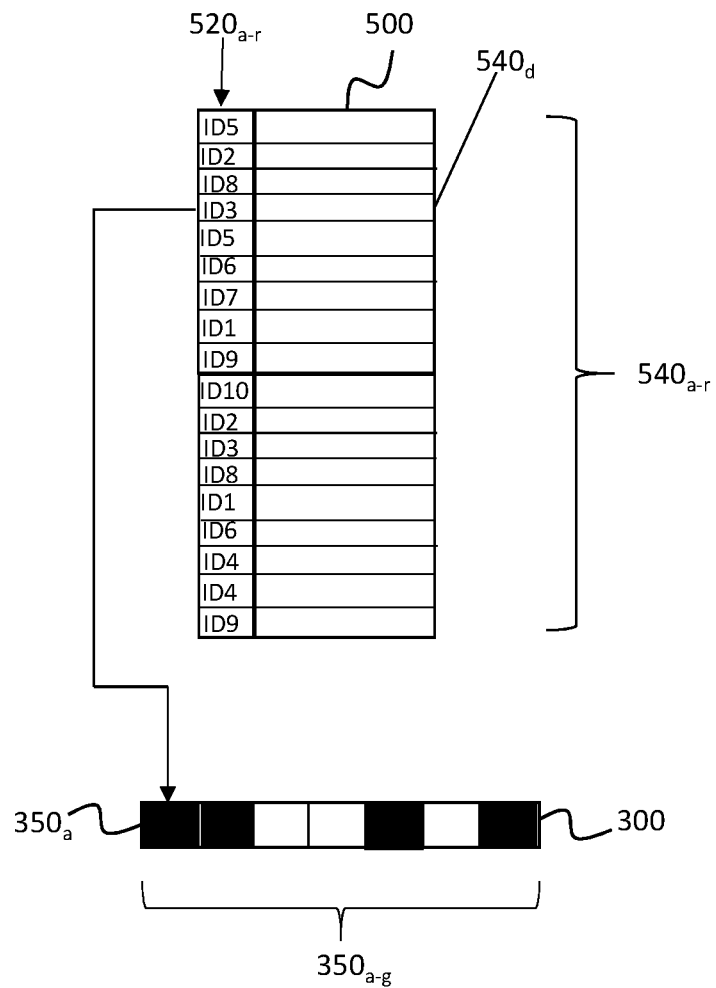
FIG. 8 is a schematic diagram of using a bitmap filter, according to an example.

FIG. 8 is a schematic diagram of using a bitmap filter generated by the previously discussed method, such as bitmap filter 300. In this example, the data source 500 of FIG. 7 is filtered using the bitmap filter 300. In other words, the bitmap filter 300 is probed using the rows of the data source 500. For ease of reference, only the date-related section of the data source 500 has been reproduced in FIG. 8.

The filtering process performed by the bitmap filter 300 is similar to the process of generating the bitmap filter 300, in that an input value, such as an identifier value, is translated to a single bit location of the bitmap filter. Such a translation may be the application of a function on the numerical value of the input identifier value. As such, the different functions discussed in relation to the "generating" examples of FIGS. 3, 4A and 4B are also applicable to the filtering process, which will now be discussed in more detail.

The bitmap filter 300 is applied to the data source 500 and identifies each entry as either a match or a non-match to the bitmap filter 300. The application of the bitmap filter 300 to the data source 500 may be a sequential or a parallel application to the plurality of entries $540_{a\text{-}r}$. Parallel processing is described in more detail below, in relation to FIGS. 17-19.

As will be appreciated by the foregoing, the bitmap filter 300 has set bits at bit locations within the bitmap filter 300 to filter out non-matches. If a to-be-filtered item, such as an identifier $520_{a\text{-}r}$ of data source 500, is mapped to a bit location that has a bit set, the to-be-filtered item is identified as a match. On the other hand, if a to-be-filtered item is mapped to a bit location that does not have a bit set the to-be-filtered item is identified as a non-match and discarded.

In this example, identifier $520_d$, is mapped to the bit location $350_a$, which has a bit set, so entry $540_d$ is identified as a match.

Looking closer at the filtering process, the data source 500 is filtered using the bitmap filter 300 by, first, identification of a single bit location of a plurality of bit locations $350_{a\text{-}g}$ in the bitmap filter 300 that corresponds to an identifier $520_{a\text{-}r}$ of an entry $540_{a\text{-}r}$ of the data source 500. Each identifier $520_{a\text{-}r}$ has a numerical value and the bit location $350_a$ is identified based on the numerical value of the corresponding identifier $520_d$. The single bit location $350_a$ is assigned to the identifier $520_d$, such that there is one-to-one mapping between each identifier $520_{a\text{-}r}$ and an assigned bit location $350_{a\text{-}g}$ in the bitmap filter 300. Following the assignment, an identification is made as to whether a bit at the assigned bit location $350_a$ is set. If the bit is set, the entry of the data source 500 is output for further consideration. The filtering is then repeated for another entry $540_{a\text{-}r}$ of the data source 500. The direct use of the numerical value of the identifier of the data source 500 provides fast processing that is not slowed down by evaluation of hash functions and hash outputs. In another example, the bitmap filter 300 may be applied to the data source 500 in parallel to all or a plurality of entries of the data source 500. Consequently, there would be no need to repeat the filtering for another entry $540_{a-r}$ of the data source 500 if the bitmap is applied in parallel to all entries or the number of repetitions would be reduced if the bitmap is applied to a plurality of entries.

Figure 9:
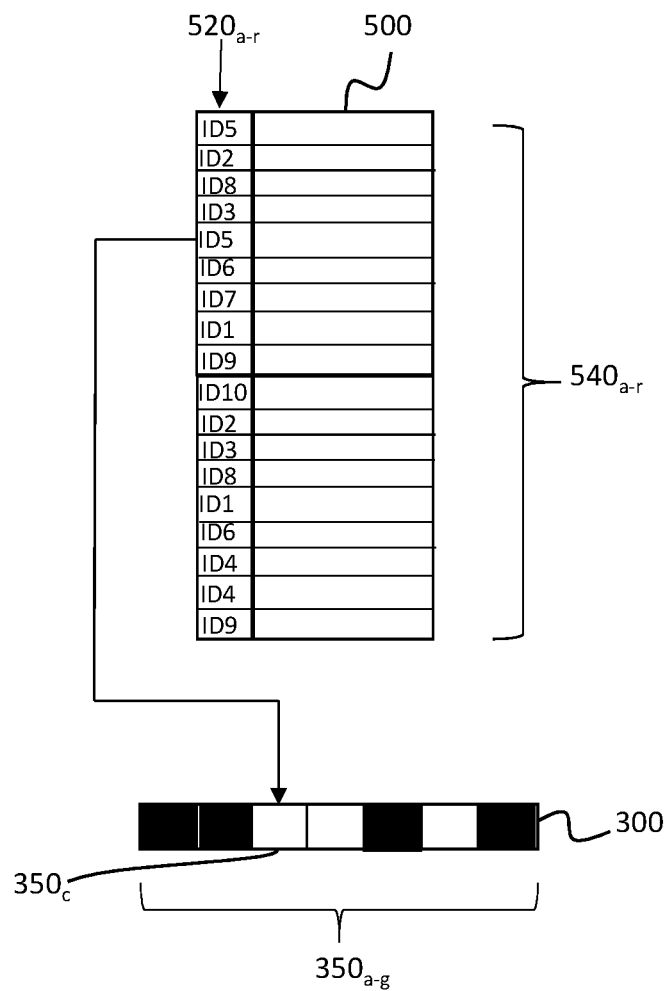
FIG. 9 is a schematic diagram of using a bitmap filter, according to an example.

FIG. 9 is a schematic diagram of the use of the bitmap filter 300 on another entry of the data source 500, specifically, the entry $540_e$ that follows the entry $540_d$ discussed in relation to FIG. 8. As discussed above, if a to-be-filtered item is mapped to a bit location that does not have a bit set the to-be-filtered item is identified as a non-match and discarded.

In this example, identifier $520_e$ is mapped to the bit location $350_c$, which does not have a bit set, so entry $540_e$ is identified as a non-match.

In the filtering process described in relation to FIGS. 8 and 9 there may be an additional step that occurs prior to the afore-described filtering process, and as such may be referred to as a pre-filtering step. The additional step determines that the numerical value of an identifier $520_{a-r}$ of an entry $540_{a-r}$ of the data source 500 is within an integer range of identifier values represented by the bitmap filter 300. That is, the pre-filtering step determines that the numerical value of the identifier $520_{a-r}$ of the entry $540_{a-r}$ is within the minimum and maximum identifier value range covered by the bitmap filter 300. As explained above with reference to FIG. 1C, the length of the bitmap filter 300 is sufficient to cover integer values of identifiers associated with the subset 200 of entries of the first data source 100 corresponding to the filter parameter 50, whilst not extending unnecessarily over integer values that are not relevant to the filtering process. As such, the pre-filtering step confirms whether the bitmap filter 300 is required to be used for the identifier.

As described in relation to FIG. 2, the bitmap filter 300 was generated based on the identifier values ID3, ID4, ID7, and ID9. As such, entry $540_i$ associated with identifier 5201 having ID10 is outside the range of the bitmap filter 300 and therefore can be identified as a non-match without proceeding with the filtering process. This is also the same for identifiers $520_b$, $520_k$(ID2) and $520_h$, $520_n$ (ID1).

In one example, an array may be generated that represents whether identifiers of a data source, such as data source 500 are present in a bitmap filter, such as bitmap filter 300. Such an array may be generated based on a relationship between an identifier in question and a corresponding byte address within the bitmap filter. In more detail, a bit location corresponding to an integer identifier of a data source is identified. The bit location is associated with a byte address within the bitmap filter. The byte within the bitmap filter corresponding to the byte address is interrogated to determine whether a bit at the identified bit location is set. If the bit is set a corresponding byte in an array is set to "1", otherwise the byte is set to "0".

Figure 10:
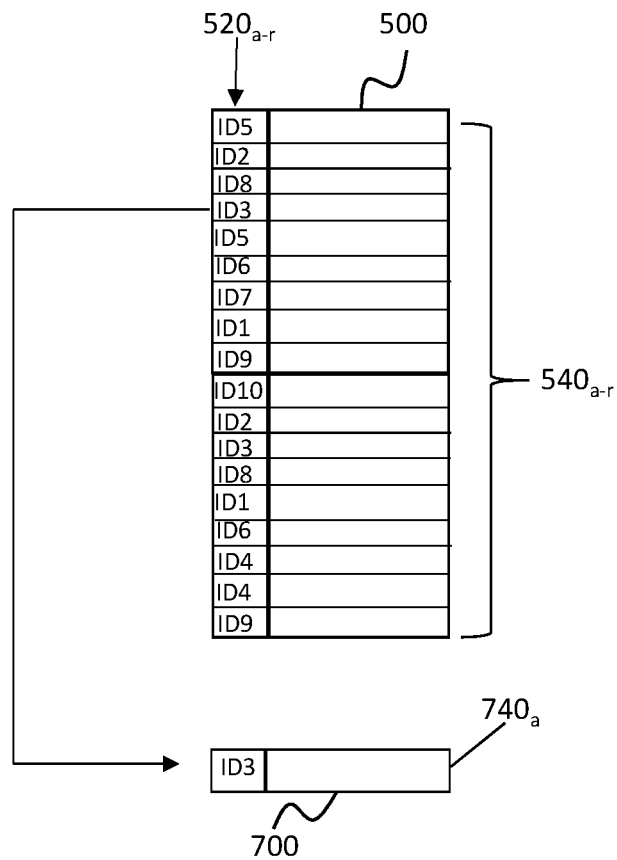
FIG. 10 is a schematic diagram of using a bitmap filter, according to another example.

FIG. 10 is a schematic diagram illustrating the outputting of the entry 540 to an entry $740_a$, for further processing by different operations. The further processing may be processing using relational algebra operators.

One example of such further processing could be a join operator between the fact table entry 540 and information defining the identifier ID3, which, in this example, is date-related information stored within dimension table 12 of FIG. 1B. Following the join operator, other operators may be applied to the output of the join operation, such as a "group by" operator, a "sort" operator, and a "limit" operator. Application of the join operator and the subsequent operators is viewed as a tree of operators, where the output of one operator is the input of the following operator.

Another example of further processing is multiple join operations, where the result of a first join operation between a fact table entry and an entry of a first dimension table feeds into a second join operation between the result of the first join operation and an entry of a second dimension table. As above, the application of operators in this way can be viewed as a tree of operators.

The identification of a single bit location $350_{a-g}$ that corresponds to an identifier of an entry of the data source 500 may be achieved by applying a function to the numerical value of the identifier $520_{a-r}$, such that execution of the function generates the single bit location $350_{a-g}$ directly from the numerical value of the identifier $520_{a-r}$. The function F described in relation to the mapping in the context of generating the bitmap filter 300 (FIGS. 3, 4a and 4B) is also applicable to the mapping of an identifier of data source 500 to a bit location of the bitmap filter 300.

As explained above with reference to FIGS. 4A and 4B, bitmap filter 300 may have a plurality of bytes, where a subset of bit locations of the bitmap filter 300 is associated with each byte. In such a case, to identify and assign a bit location to an identifier of data source 500 a function may be used that, when executed, identifies a byte address of the bitmap filter 300 and a bit address within the identified byte based on the numerical value of the identifier wherein the byte address and the bit address identify the single bit location $350_{a-g}$. In one example, the function may be a modulo function that generates a quotient, which identifies the byte number, and a remainder, which identifies the bit number within the identified byte.

Figure 11:
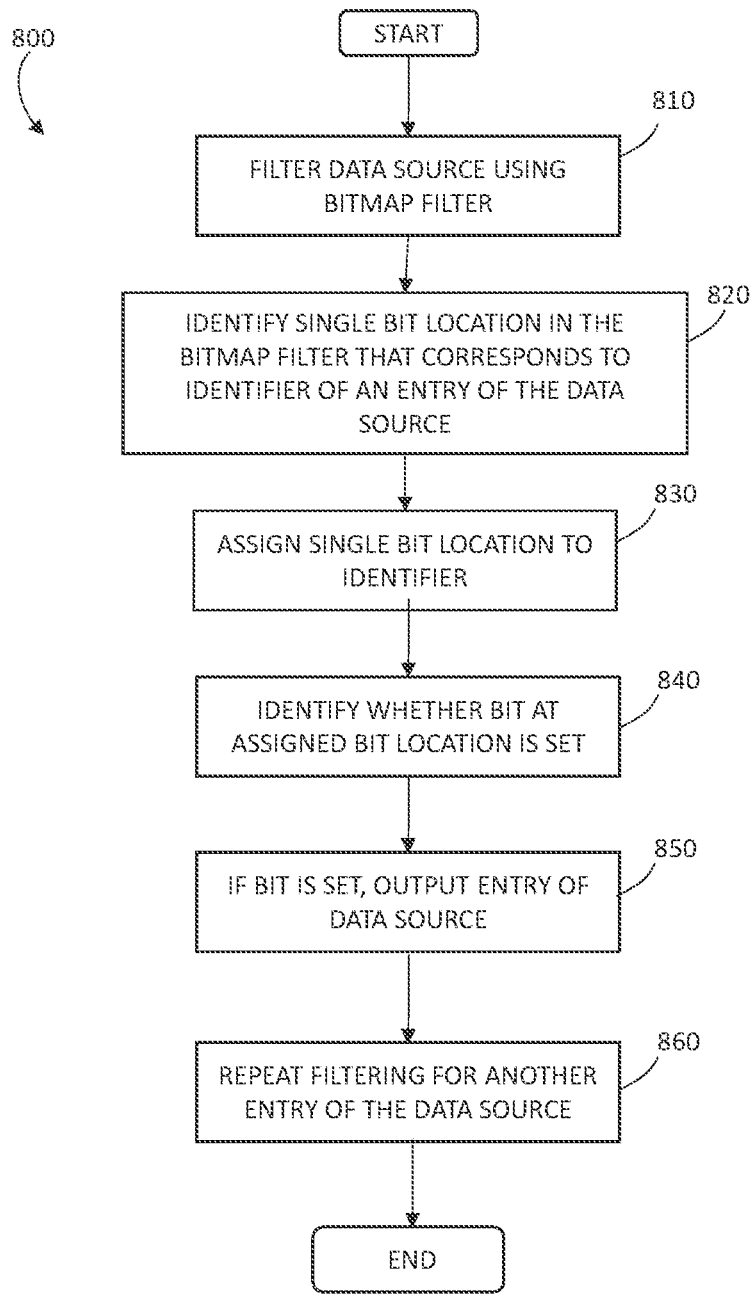
FIG. 11 is a flowchart of the method of using a bitmap filter of FIGS. 8 and 9, according to an example.

FIG. 11 is a flowchart of a method 800 of using, and, more specifically, probing a bitmap filter generated by the method discussed in relation to FIGS. 1-6. The method 800 starts at block 810 where a data source 500 is filtered using the bitmap filter 300. The method proceeds to block 820 where a single bit location $350_a$, of a plurality of bit locations $350_{a-g}$ in the bitmap filter 300 is identified, which corresponds to an identifier $520_{a-r}$ of an entry $540_{a-r}$ of the data source 500. Each identifier $520_{a-r}$ has a numerical value and the bit location $350_a$ is identified based on the numerical value of the corresponding identifier $520_d$.

Following the identification, the method proceeds to block 830 where the single bit location $350_a$ is assigned to the identifier $520_d$, such that there is one-to-one mapping between each identifier $520_{a-r}$ and an assigned bit location $350_{a-g}$ in the bitmap filter 300.

At block 840, the method identifies whether a bit at the assigned bit location $350_a$ is set.

At block 850, if the bit is set the entry of the data source 500 is output. Following the output, at block 860, the filtering 810 is repeated for another entry $540_{a-r}$ of the data source 500. In another example, the repeated filtering may occur before or at the same time as the outputting of the entry of the data source 500.

Figure 12:
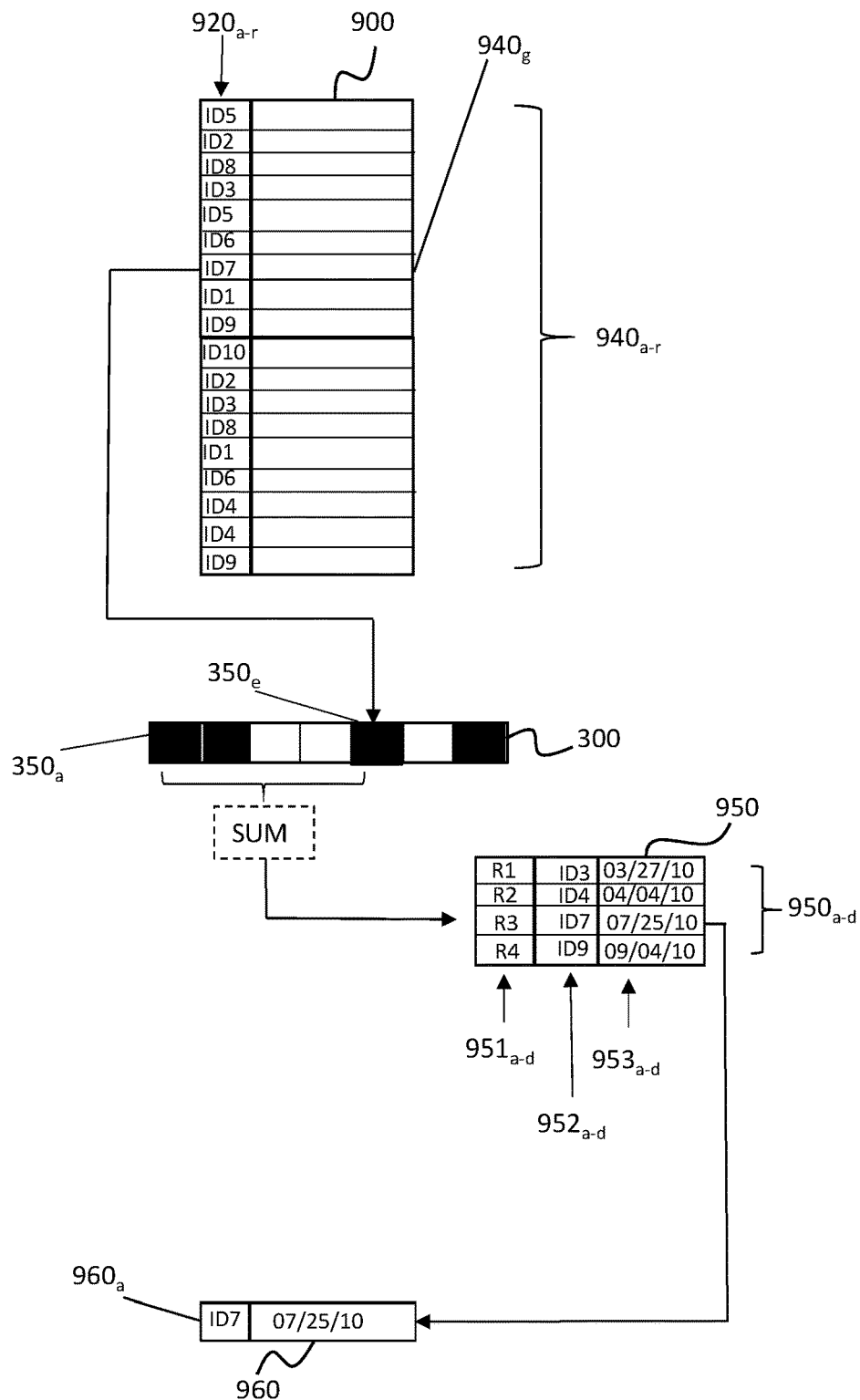
FIG. 12 is a schematic diagram of using a bitmap filter, according to a further example.

FIG. 12 is a schematic illustration of using the bitmap filter 300 generated by the method discussed in relation to FIGS. 1-6. In this example, a data source 900 is filtered using the bitmap filter 300. That is, the bitmap filter is probed by the data source 900. The data source 900 corresponds to the data source 500, described in relation to FIGS. 7-10. The example described in relation to FIG. 12 is similar to the example described in relation to FIGS. 7-10, but further describes the use of the bitmap filter in identifying an associated row of another data source, where the row corresponds to an identifier of the data source 900.

In the example of FIG. 12, a set bit of the bitmap filter 300 at the bit location $350_e$, is associated with an entry, entry $940_g$, of the data source 900 and, as such, the identifier $920_g$ of entry $940_g$ is a match to the bitmap filter 300. Matched identifier $920_g$ of the entry $940_g$ is associated with, and, more specifically, is defined by, a row of another data source used to generate the bitmap filter 300. In this example, the other data source is the first data source 100 (see FIG. 1B); the dimension table 12 relating to dates. Each identifier of the data source 900 is a foreign key.

The data source 950 is an intermediary table. In this example, the data source 950 contains identifiers $952_{a-d}$ and respective date information $953_{a-d}$ defining each of the identifiers $952_{a-d}$. As mentioned above, the date information $953_{a-d}$ originates from the first data source 100. The identifiers $952_{a-d}$ correspond to bit locations within the bitmap filter 300. The data source 950 also contains a plurality of row identifiers $951_{a-d}$ for each row. The row identifiers each correspond to one of the plurality of entries $950_a$a and have a numerical value. The plurality of entries $950_{a-d}$ are sorted based on the numerical values of the identifiers $952_{a-d}$, and the plurality of row identifiers $951_{a-d}$ increment by 1 for each entry. In this example, the plurality of entries $950_{a-d}$ are sorted in ascending order based on the numerical values of the identifiers $952_{a-d}$. The data source 950 may have been generated at the same time as the bitmap filter 300 as part of the build phase.

A row location, corresponding to a matched identifier of the data source 900, within the data source 950 is determined based on a sum of a number of bits set in bit locations between the bit location $350_e$ of the set bit associated with the entry of the data source 900 and a bit location $350_a$ in the bitmap filter corresponding to different, known, row identifier, R1 of $950_a$. In this example, the sum is the number of bits preceding and including the bit set at bit location $350_e$. Accordingly, the bit location $350_a$ is a location corresponding to a minimum bit in the bitmap filter 300.

In this example, the sum of the number of bits set between bit location $350_e$ and bit location $350_a$ is 3 (three). The sum includes both the bits set at the bit locations $350_e$ and $350_a$.

The sum of 3 (three) identifies the $3^{rd}$ row, $950_c$, of the other data source 950 as being associated with the identifier ID7. The identification of the row $950_c$ facilitates interrogation of the row $950_c$, which in turn, allows information from the associated row $950_c$ of the data source 950 to be output (shown schematically as record 960).

The outputting of information may be part of a join process for pulling together matching rows of different data sources.

The one-to-one mapping of single integer identifiers corresponding to a filter parameter to single bit locations within the bitmap filter 300 enables the direct look-up to a specific row of another data source, that defines the identifier corresponding to the filter. The single integer identifiers act as an index to an array of rows. In this way, simplified logic is used that does not require a hash function evaluation, verification of a hash output—to ensure no collisions—or traversal of more than one row to perform a look-up.

Figure 13:
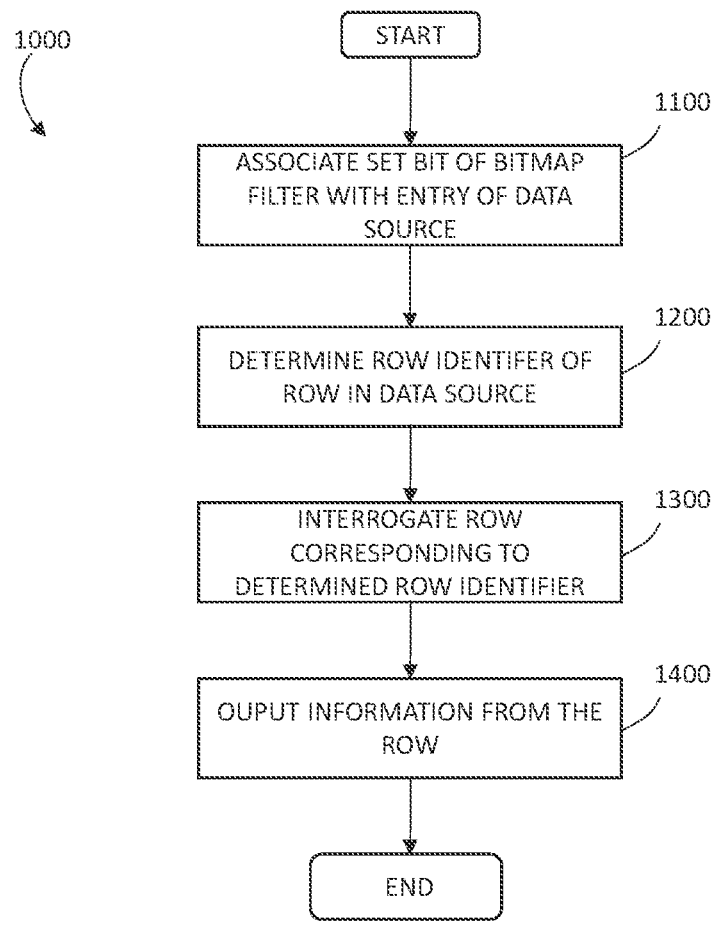
FIG. 13 is a flowchart of the method of using a bitmap filter of FIG. 12, according to an example.

FIG. 13 is a flowchart of a method 1000 of using a bitmap filter generated by the method described in relation to FIGS. 1-6.

The method 1000 starts at block 1100 where a set bit of the bitmap filter 300 is associated with an entry $940_g$ of a data source 900, where the set bit is located at a bit location $350_e$ within the bitmap filter 300.

The method proceeds to block 1200, where a row location, such as, a row identifier $951_{a-d}$, of an associated row $950_{a-d}$ in another data source 950 is determined based on a sum of a number of bits set in bit locations between the bit location $350_e$ of the set bit associated with the entry of the data source and a bit location $350_a$ in the bitmap filter corresponding to a different, known, row identifier.

After the determination, at block 1300, the associated row $950_c$ of the data source 950 corresponding to the determined row identifier $951_c$ is interrogated.

Following the interrogation, at block 1400, information from the associated row $950_c$ of the data source 950 is output.

Figure 14:
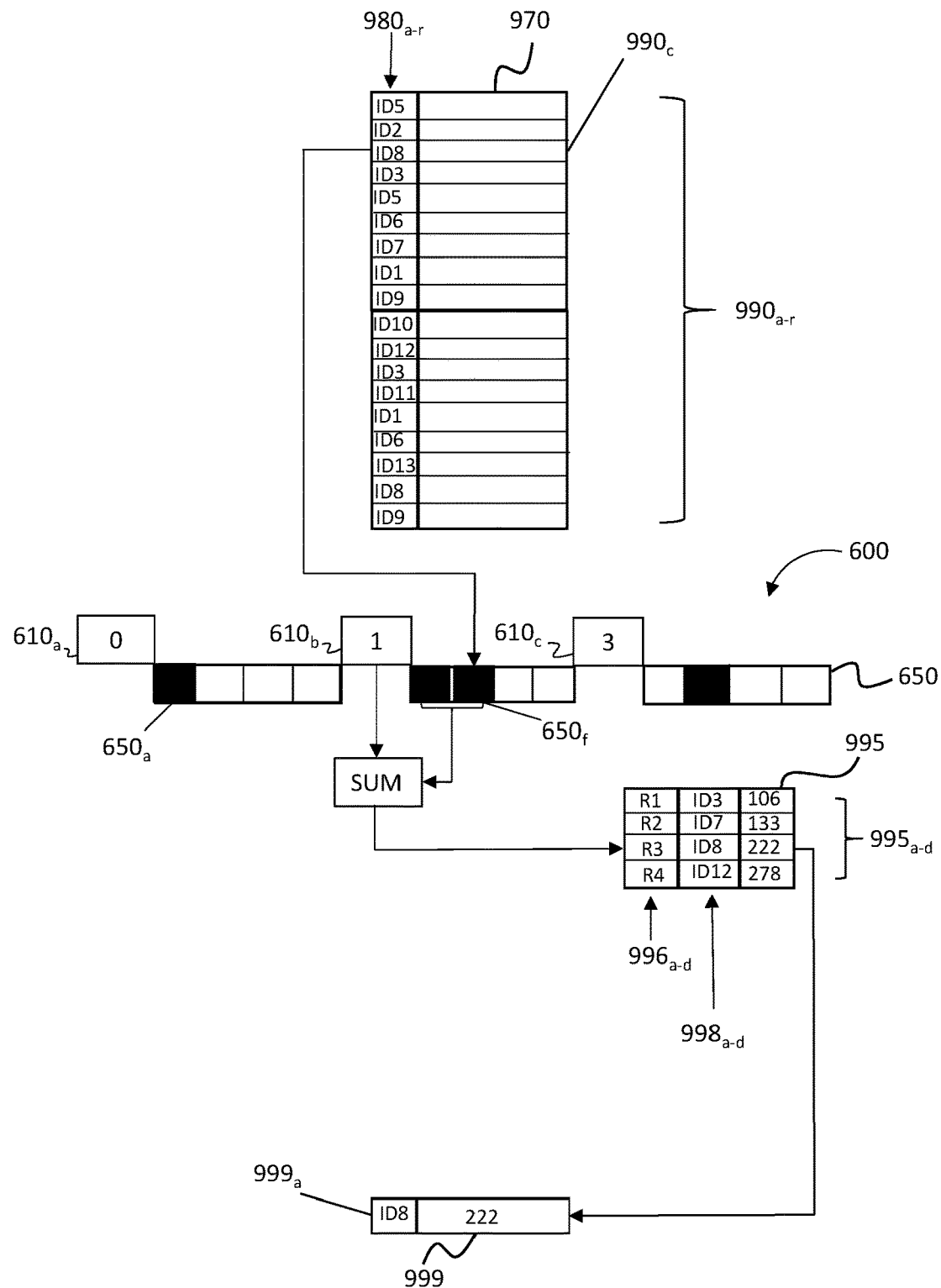
FIG. 14 is a schematic diagram of using an extended bitmap vector, according to another example.

FIG. 14 is a schematic diagram of using an extended bitmap vector 600 on a data source 970. The extended bitmap vector 600 contains a bitmap filter 650 and a plurality of counters $610_{a-c}$ and provides a practical way of organizing relevant data that reduces the amount of memory needed. The bitmap filter 650 is configured to implement one-to-one mapping of an identifier of an entry of the data source 970 to a bit location within the bitmap filter 650. As for FIG. 12, FIG. 14 depicts implementation of a probe phase, which may be part of a join process. The bitmap filter 650 may have been generated in accordance with the methods described in relation to FIGS. 1-6 as part of a build phase. The plurality of counters $610_{a-c}$ may also have been generated as part of the build phase.

The data source 970 is a different fact table to the fact table represented by the data sources 500 and 900. The data source 970 contains a plurality of identifiers $980_{a-r}$ that are defined by another data source, for example the dimension table 14 (relating to location) of FIG. 1. In this example, the bitmap filter 650 was generated based on location identifiers corresponding to a filter parameter relating to location. Accordingly, the data source 970 is filtered based on the locations defined by the plurality of identifiers $980_{a-r}$.

The plurality of counters $610_{a-c}$ count bits set in the bitmap filter 650. Each bit location $650_{a-l}$ of the bitmap filter 650 is associated with one of the plurality of counters $610_{a-c}$, such that the plurality of counters $610_{a-c}$ is interleaved with the bitmap filter 650.

In this example, bit locations $650_{a-d}$ are associated with counter $610_a$, bit locations $650_{e-h}$ are associated with counter $610_b$, and bit locations $650_{i-l}$ are associated with counter $610_c$.

The extended bit vector 600 has dual functionality: (1) as a bitmap filter; and (2) as a mapping to facilitate database join. For (1) the bitmap filter is deterministic, so no false positives are generated. For (2) the extended bit vector 600 effectively translates sparse identifiers to a set of dense identifiers. Use of a single structure to perform (1) and (2) reduces the amount of memory needed, which, in turn, allows the structure to be stored in cache memory for fast access using streamlined code.

In one example, 32-bit sections of the bitmap filter 650 may be interleaved with 32-bit precomputed counters.

The data source 995 has the same function as the data source 950 of the example of FIG. 12 in that the data source 995 is an intermediary table comprising a plurality of entries $995_{a-d}$ corresponding to a filter parameter. The data source 995 may have been generated at the same time as the bitmap vector 600 during a build phase. In addition, like the data source 950, the data source 995 has: 1) a plurality of entries $995_{a-d}$ having respective identifiers $998_{a-d}$ that correspond to set bits in the bitmap filter 650, where each entry contains information defining the corresponding identifier; and 2) a plurality of row identifiers $996_{a-d}$, each corresponding to one of the plurality of entries $995_{a-d}$, the plurality of entries $995_{a-d}$ being sorted in ascending order of identifiers $998_{a-d}$, and the plurality of row identifiers $996_{a-d}$ incrementing by 1 for each entry.

In this example, after a row of the data source 995 is identified the information within that row may be output to a row $999_a$ of a result set 999, as part of a join operation. In the current example, the information is a location code—222. As previously described, outputs, such as result set 999, may be subject to further processing using relational algebra operators.

Each counter $610_{a-c}$ counts the number of bits set in the bitmap filter 650 in bit locations before the bit locations associated with the counter and thus defines a rolling count of set bits within the bitmap filter 650. The count of each counter is added to a delta that represents the number of bits set in bit locations associated with the counter both preceding and including the bit location of the set bit in question.

Figure 15:
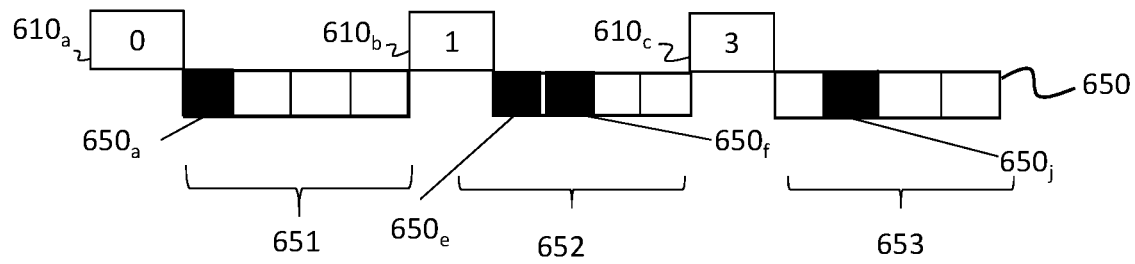
FIG. 15 is a schematic diagram of the extended bit vector method of FIG. 14, according to another example.

FIG. 15 is a schematic diagram of the extended bitmap vector 600 of FIG. 14. The bitmap filter 650 is partitioned into a plurality of sections, including a first section 651, a second section 652, and a third section 653. The second section 652 of the bitmap filter 650 immediately follows the first section 651 and includes the set bit in question, in this case, the set bit at bit location $650_f$. Each section of the bitmap filter 650 is associated with one of the plurality of counters $610_{a-c}$. Each counter defines a count of bits set in all preceding sections of the bitmap 650, and as such can be considered a cumulative count.

The counter $610_b$ is associated with the bit location $650_f$ of the set bit, as well as the other bit locations within the second section 652 of the bitmap filter 650. The counter $610_b$ defines a count of bits set in the first section 651 of the bitmap filter 650 preceding the second section 652 of the bitmap filter 650 containing the bit location $650_f$ of the set bit.

The counter $610_c$ is associated with the bit location $650_j$ that contains a set bit, as well as the other bit locations within the third section 653 of the bitmap 650. The counter $610_c$ defines a count of bits set in all sections preceding the third section 653, so the first section 651 and the second section 652 of the bitmap filter 650. The first section 651 contains one set bit and the second section contains two set bits so the counter $610_c$ has a count of three.

Figure 16:
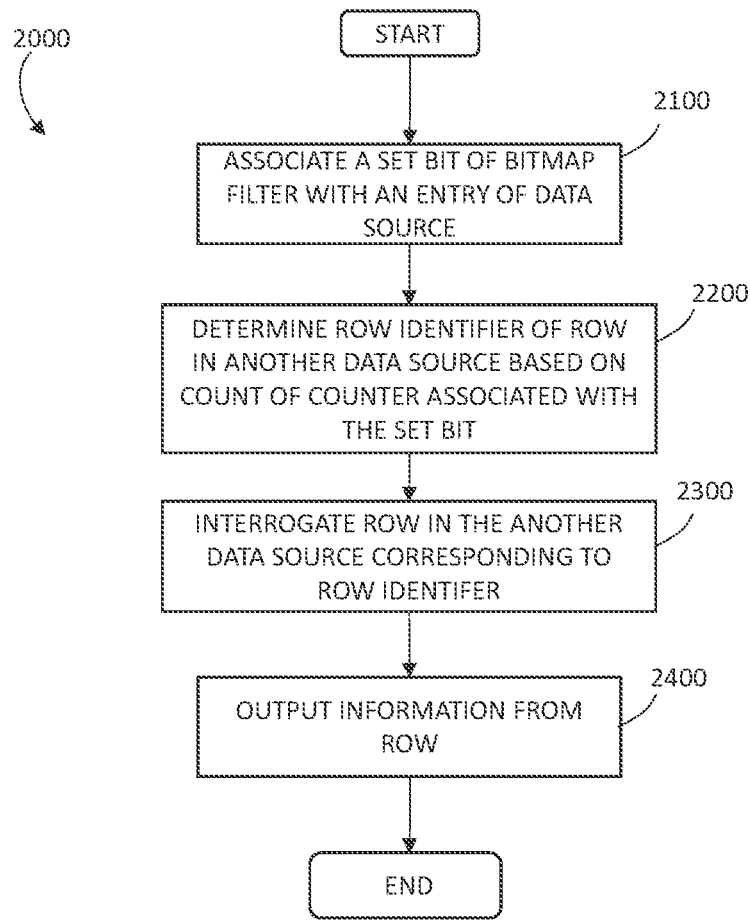
FIG. 16 is a flowchart of the method of using an extended bitmap vector of FIG. 12, according to an example.

FIG. 16 is a flowchart of a method 2000 of using the extended bit vector 600 comprising a) a bitmap filter 650 configured to implement one-to-one mapping of an identifier of an entry of a data source to a bit location within the bitmap filter 650 and b) a plurality of counters $610_{a-c}$ of bits set in the bitmap filter 650. Each bit location $650_{a-i}$ of the bitmap filter 650 is associated with one of the plurality of counters $610_{a-c}$.

The method 2000 starts at block 2100 where a set bit of the bitmap filter 650 is associated with an entry $990_c$ of a data source 970, wherein the set bit is located at a bit location $650_f$ within the bitmap filter 650. In one example, the association of block 2100 may identify a single bit location $650_f$ of a plurality of bit locations in the bitmap filter 650, that corresponds to an identifier $980_{a-r}$ of an entry of the data source 970, wherein each identifier $980_{a-r}$ has a numerical value and the bit location $650_f$ is identified based on the numerical value of the corresponding identifier $980_{a-r}$. After the identification, the single bit location $650_f$ is assigned to the identifier 980C, such that there is one-to-one mapping between each identifier $980_{a-r}$ and an assigned bit location in the bitmap filter 650.

The method proceeds to block 2200 where a row identifier $996_{a-d}$ of an associated row in another data source 995 is determined based on a count of a counter $610_b$ associated with the bit location $650_f$ of the set bit. The count of the counter $610_b$ is a sum of a number of set bits in bit locations between the bit location $650_f$ of the set bit associated with the entry of the data source 970 and a bit location $650_a$ in the bitmap filter 650 corresponding to a different, known, row identifier.

At block 2300, the method 2000 proceeds to interrogate the associated row $995_c$ of the data source 995 corresponding to the determined row identifier $996_c$.

Following the interrogation, at block 2400, information from the associated row $995_c$ of the data source 995 is output (shown by record 999 of FIG. 14). As previously described, further processing, such as additional relational algebra operators, may be applied to the row $995_c$ of the data source 995.

Single Instruction Multiple Data (SIMD) Implementation

As briefly mentioned above, a bitmap filter in accordance with the methods described in relation to FIGS. 7-19 may be parallelized for a plurality of entries of a data source. In particular, parallel processing of the filtering process may be implemented using single instruction multiple data (SIMD) processing. Such parallel processing is particularly advantageous in achieving accelerated small probe actions within a probe phase of a join process, for example, for small probes having a small set of identifiers on the build side. In one example, the size of a small set of identifiers may be such that a bitmap filter for the identifiers can fit into a register set of a computer processor, for example, a SIMD register set.

During a probe phase, SIMD processing can be used to filter a data source using a bitmap filter generated by the previously described methods, such as the bitmap filter 300 (see FIGS. 1C, 2, 3, 8, 9 and 12), and bitmap filter 650 (see FIGS. 14 and 15). SIMD processing can also be used when determining row identifiers for matched identifiers of an extended bitmap vector, such as the extended bitmap vector 600 of FIGS. 14 and 15. The streamlined nature of the aforementioned algorithms for generating a bitmap filter, and subsequent filtering using the bitmap filter, enables fine-grained parallelization with SIMD. As will be discussed in more detail below, a SIMD-enhanced method can take packed encoded identifier values and (1) check the values against a bitmap filter (that is, filter the values using a bitmap filter); and (2) translate the values to row locations of a data source. After the check of (1) and the translation of (2), a join process may be carried out between at least one row of a probe-side data source and at least one row of a build-side data source (at the corresponding identified row location).

Figure 17:
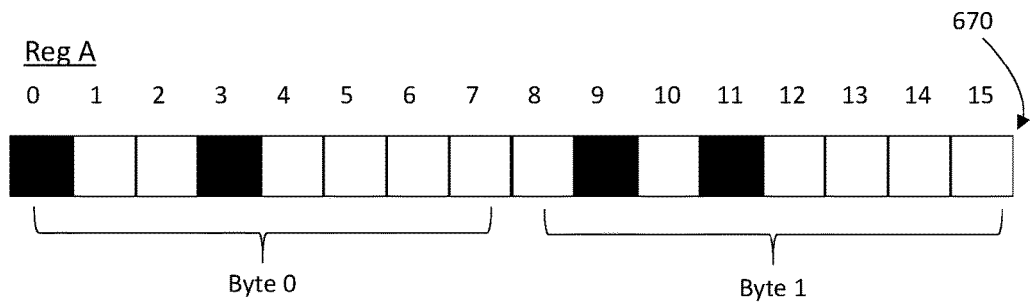
FIG. 17 is a schematic diagram of a single instruction multiple data implementation, according to an example.
Figure 17:
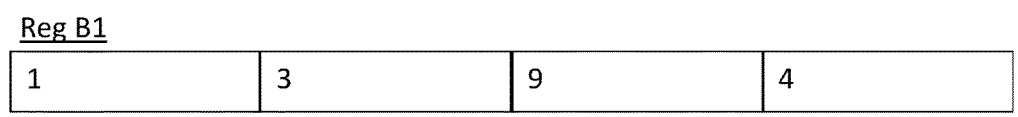
Figure 17:
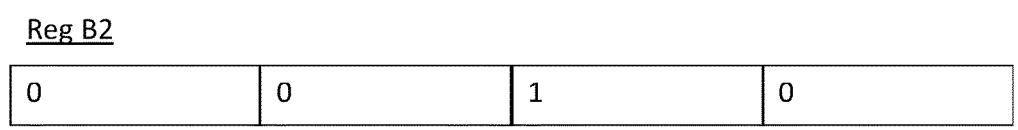
Figure 17:
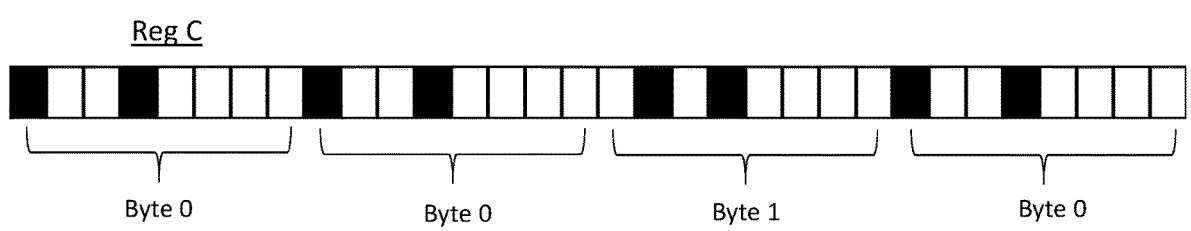
Figure 17:
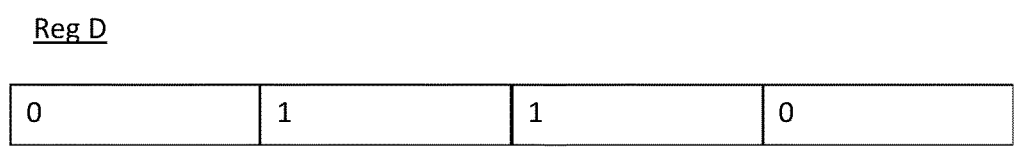

FIG. 17 is a schematic diagram of the output of a SIMD filtering process according to an embodiment. Each of registers A-D is a SIMD register containing data loaded from a computer memory. An operation on each register may be a SIMD instruction that is applied to a plurality, and preferably all of, the data within the register in question. In the context of the present disclosure, "a SIMD instruction" may refer to multiple SIMD instructions operating on the same portion of data within a register.

Figure 18:
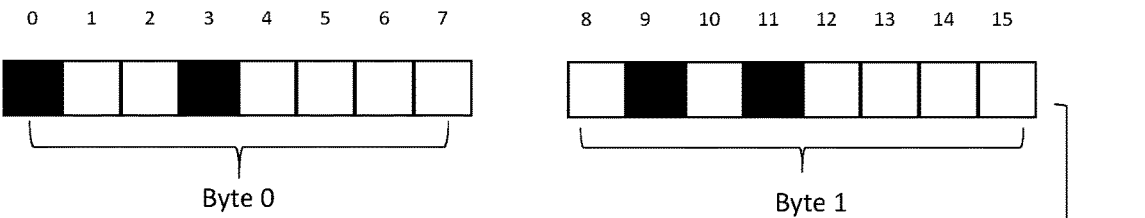
FIG. 18 is a schematic diagram of single instruction multiple data implementation, according to an example.
Figure 18:
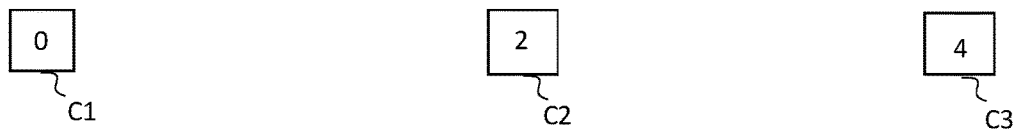
Figure 18:
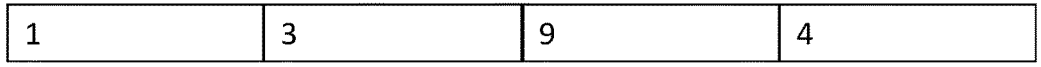
Figure 18:
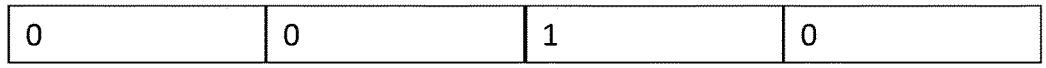
Figure 18:
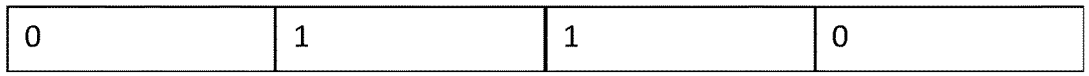
Figure 18:
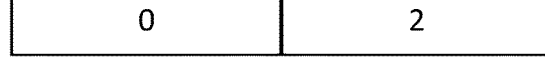
Figure 18:
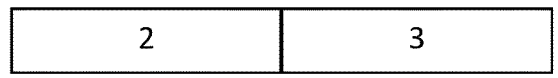

The depiction of each register in FIGS. 17 and 18 illustrates a logical configuration of data when loaded into each register. The physical addresses of the data within the computer memory may be different to the depicted logical configuration of the data within the registers and the logical addresses of the data within the computer memory.

A bitmap filter may be loaded into one or more registers of a computer processor from a computer memory. The size of the bitmap filter determines the number of registers required for loading the bitmap filter from the computer memory. If the bitmap filter is of a length that exceeds the length of a register, for example, the bitmap may be 128 bits and a register may be 64 bits, a plurality of registers will be required to store the bitmap. As another example, a bitmap filter may require 32×256-bit registers. A compiler associated with the computer processor determines which registers of the computer processor to use for loading the bitmap filter.

In cases where the bitmap filter is of a size that requires a plurality of registers, one or more additional steps may be required to identify which register of the plurality of registers is relevant to the SIMD implementation. The additional steps are discussed in more detail below.

Register A, Reg A, is a single register of the plurality of registers of a computer processor that stores part of a bitmap filter 670. For ease of reference, a 16-bit portion of Reg A is depicted in FIG. 17. As for the bitmap filters 300 and 650, the bitmap filter 670 provides one-to-one mapping between an integer identifier value and a single bit location of the bitmap filter 670.

The bitmap filter 670 of Reg A has set bits (represented by filled-in blocks) at bit locations 0, 3, 9 and 11. Accordingly, any identifier value that maps to one of the bit locations 0, 3, 9 and 11 will be found as a match to the filter condition defined by the bitmap filter 670.

Register B1, Reg B1, represents a sequence of 8-bit integer identifiers that are to be filtered using the bitmap filter 670 of Reg A. Since the example of FIG. 17 uses a zero-based numbering system, the identifiers to be filtered are represented in Reg B1 by integers 1, 3, 9 and 4 that correspond to each identifier shifted by the minimum identifier value represented in the bitmap filter 670 (corresponding to a minimum bit location of the bitmap filter 670). Accordingly, the integers 1, 3, 9, and 4 of Reg B1 identify the bit address of the corresponding bit to be fetched from the bitmap filter 670 so that filtering can occur. In the example of FIG. 17, the minimum bit location corresponds to a minimum identifier value of 4 (four):

| Integer identifier to be filtered | Minimum identifier value of bitmap filter | Integer of Reg B1 |
| --- | --- | --- |
| 5 | 4 | 1 |
| 7 | 4 | 3 |
| 13 | 4 | 9 |
| 8 | 4 | 4 |

An operation is applied to Reg B1 to create data to be stored in Register B2, Reg B2, as an output. In this example, a byte wise division operation is applied to Reg B1 that divides the integer value of Reg B1 by 8 (eight). The division operation results in an output of a byte address for each integer (bit address) of Reg B1. In the current case:

| Integer value of Reg B1 | Operation | Byte address of Reg B2 |
| --- | --- | --- |
| 1 | ÷8 | 0 |
| 3 | ÷8 | 0 |
| 9 | ÷8 | 1 |
| 4 | ÷8 | 0 |

In another example, the operation applied to Reg B1 may be one of: a bitwise OR operation, a bitwise AND operation, and a masking operation.

Reg B2 represents the byte addresses of the bytes of the bitmap filter of Reg A that correspond to the identifiers of Reg B1.

The contents of Register C, Reg C, are created by application of an operation to Reg A based on Reg B2. The operation applied to Reg A results in Reg C containing a version of the data of Reg A that corresponds to the identified byte addresses of Reg B2. The operation applied to Reg A based on Reg B2 may be one or more of the following: a copy operation, a load operation, a masking operation, a look-up operation, and a fetch operation.

Register D, Reg D, contains data generated as an output of an operation applied to Reg C based on the bit addresses of Reg B1. The operation results in Reg D representing whether an identifier of Reg B1 is present in the bitmap filter 670. Reg D uses a byte per identifier value, where the byte is "0" if the identifier is not present in the bitmap filter 670 (not a match) and "1" if the identifier is present in the bitmap filter 670 (a match). The operation applied to Reg C based on Reg B1 may be one or more of the following: a look-up operation, a fetch operation, and a pairwise operation, for example, pairwise mask, pairwise shift, or pairwise AND.

In one example, Reg D is used as the basis of an output array Q[0 . . . n–1] for an array of integer identifiers F[0 . . . n–1] of a data source (for example, a fact table), such that Q[i]=0 if F[i] is not present in the filter condition represented by the bitmap filter 670, and Q[i]=1 otherwise.

As mentioned above, the bitmap filter 670 is loaded into a plurality of registers and Reg A, is a single register of the plurality of registers (not shown) that stores part of the bitmap filter 670. In the example of FIG. 17, Reg A has been identified as the relevant register to the identifiers of Reg B1 and the identifiers of Reg B1 are 8-bit identifiers.

As mentioned above, the identifiers of B1 may be 16-bit identifiers so Reg B1 has two bytes per identifier value. In such a case, where the bitmap filter is of a size that is larger than a single register, the bitmap filter is loaded into a plurality of registers and a two-step process is implemented to identify the bit location within the bitmap filter that corresponds to the 16-bit identifier. First, a high order byte of each 16-bit identifier identifies the relevant register of the plurality of registers that contains a bit corresponding to the identifier. Secondly, a low order byte of each 16-bit identifier determines whether the bit corresponding to the identifier is set (as described above for the 8-bit identifiers).

FIG. 18 is a schematic diagram of how SIMD can be used to determine a row location for a matched identifier of an extended bitmap vector. The example of FIG. 18 may be implemented in conjunction with the example of FIG. 17 so that the filtering and row identifying processes operate together.

The example of FIG. 18 may also be implemented in conjunction with the aforementioned example where the identifiers of B1 are 16-bit identifiers and the bitmap filter is larger than a single register such that the bitmap filter is loaded into a plurality of registers, and a two-phase process is implemented to identify the bit location within the bitmap filter that corresponds to the 16-bit identifier. In such a scenario, a computer-implemented method of using an extended bit vector comprising a bitmap filter that can be loaded into a plurality of registers and configured to implement one-to-one mapping of a 16-bit identifier of an entry of a data source to a bit location comprises: identifying a register of the plurality of registers, that the register corresponding to an identifier of an entry of the data source, wherein each identifier has a numerical value and the register is identified based on the numerical value of the corresponding identifier; and identifying a single bit location, of a plurality of bit locations in the register, that corresponds to the identifier, wherein the bit location is identified based on the numerical value of the identifier. In one example, the register is identified based on the high-order byte of the 16-bit identifier and the bit location within the identifier is identified based on the low order byte of the 16-bit identifier.

Register E, Reg E, of FIG. 18 is a representation of a register that stores a count of set bits within sections of the bitmap filter 670 of Reg A (reproduced in FIG. 18 for ease of reference). As such, together Reg A and Reg E store an extended bitmap vector 675, like the extended bitmap vector 600 of FIG. 14.

Each counter C1, C2 and C3 defines a count of the number of set bits within preceding sections of the bitmap filter. In this case, counter C1 precedes the first byte of the bitmap filter, byte 0, so Counter C1 has a count of 0 (zero). Counter C2 defines a count of the number of bits set within preceding byte 0. In this case, bits at bit locations 0 and 3 are set in byte 0, so counter C2 has a count of 2 (two). Counter C3 defines a count of the number of bits set within the preceding bytes: byte 0 and byte 1. In this case, bits at bit locations 0 and 3 are set in byte 0 and bits at bit locations 9 and 11 are set in byte 1, so counter C3 has a count of 4 (four).

Registers B1, B2, and D of FIG. 18 are the same as registers B1, B2, and D of FIG. 17. While Reg C is not shown, it will be appreciated from the foregoing that it is utilized in the generation of the data in Reg D.

To identify a row location (for example, a row identifier) in an intermediary data source for a matched identifier of Reg B1, an operation is applied to Reg D based on Reg B2 and Reg E to create data stored in a further register, Register F, which indicates the count of a counter associated with the identified byte of Reg B2. The operation applied to Reg D based on Reg B2 and Reg E inputs a version of the associated counters of Reg E into Reg F and may be one or more of the following: a look-up operation, a copy operation, a load operation, a masking operation, and a fetch operation.

In more detail, a version of a counter associated with a set bit (from Reg D) of an identified byte (Reg B2) is copied from Reg E and input into Reg F.

In the example of FIG. 18, Reg D indicates (using "1") that the identifier 3 of B1 is a match to the bitmap filter of Reg E. The byte address of identifier 3 is byte 0 (indicated by Reg B2). Thus, the count of counter C1 (associated with byte 0) is copied and input to Reg F. Similarly, Reg D indicates (using "1") that the identifier 9 of B1 is a match to the bitmap filter of Reg E. The byte address of identifier 9 is byte 1 (indicated by Reg B2). Thus, the count of counter C2 (associated with byte 1) is copied and input to Reg F.

An operation is applied to Reg F to create data stored in a further register, Reg G, where Reg G indicates a row location corresponding to the matched identifiers relating to the counts of Reg F, that is, identifiers 3 and 9 of Reg B1. The operation adds the number of bits set in the byte of the byte address indicated by Reg B2, up to and including the bit set at the bit address of the identifier indicated by Reg B1, to the counts of Reg F.

For identifier 3 of Reg B1, the number of bits set in byte 0 (indicated by Reg B2) up to and including the bit set at bit address 3 is 2 (two) because the bit at bit location 0 is set and the bit at bit location 3 is set (as expected, since Reg D indicates that the bit associated with identifier 3 is set). In line with the explanation of the previous paragraph, the row location is equal to the sum of the count of counter C1 (0 as indicated by Reg F) and 2 (two), which is 2 (two). Therefore, the second row of an intermediary table contains information associated with identifier 3 of Reg B1.

For identifier 9 of Reg B1 the number of bits set in byte 1 (indicated by Reg B2) up to and including the bit set at bit address 9 is 1 (one) because the bit at bit location 9 is set and this is the first set bit of byte 1. The row location is equal to the sum of the count of counter C2 (2 as indicated by Reg F) and 1 (one), which is 3 (three). Therefore, the third row of an intermediary table contains information associated with identifier 9 of Reg B1.

The operation for the example of FIG. 18 is as follows:

| Reg F | Operation | Row identifier of Reg G |
| --- | --- | --- |
| 0 | +2 | 2 |
| 2 | +1 | 3 |

The intermediary table referred to by Reg G is a table (for example, like 950 of FIG. 12 and 995 of FIG. 14) that contains entries of an input table (for example, like the data source 900 of FIG. 12 and 970 of FIG. 14), that match a filter parameter, used to generate the bitmap filter 670 A column of the intermediary table referred to by Reg G contains identifiers that match the filter parameter. In this case, identifiers corresponding to the identifiers 3 and 9 of Reg B1 (because they relate to a set bit—indicated by Reg D). The identifiers are sorted based on numerical value and the intermediary table referred to by Reg G has a row identifier for each row. Reg G indicates the row of the intermediary table that defines each of the identifiers 3 and 9.

In another example, the counters of set bits of Reg E may be stored in the same register as the bitmap filter of Reg A. In one example, the counters may be 32-bit counters and be inserted between 32-bit portions of the bitmap filter, forming an extended bit vector.

In one example, the SIMD implementation described in relation to FIGS. 17 and 18 may be repeated for each register within a SIMD register set of a processor into which a bitmap filter is loaded, where the number of repetitions corresponds to the number of SIMD registers into which the bitmap filter is loaded. As an example, a SIMD register set may consist of up to 8 registers into which a bitmap filter is loaded. In one example, a 128-bit portion of the bitmap filter may be loaded in to each SIMD register. Each register may be a 256-bit register. For instance, in the examples of FIGS. 17 and 18, Reg A may be one of 8 registers that store the bitmap filter 670. Register access is much faster than memory access so repeating the SIMD implementation of FIGS. 17 and 18 for each register up to 8 SIMD registers provides a very quick way to process data in up to 8 SIMD registers. If a portion of the bitmap filter is not relevant to the probe that portion can be ignored, for example, by masking out the portion.

The SIMD implementation described in relation to FIGS. 17 and 18 may be implemented by a processor having SIMD extensions and any size SIMD register. Examples of SIMD registers include: AVX-2 SIMD registers and AVX-512 registers. In alternative examples, embodiments corresponding to FIGS. 1-16 may be practiced without SIMD extensions, for example, using any modern processor such as Intel Xeon, AMD Opteron, and ARM.

Figure 19:
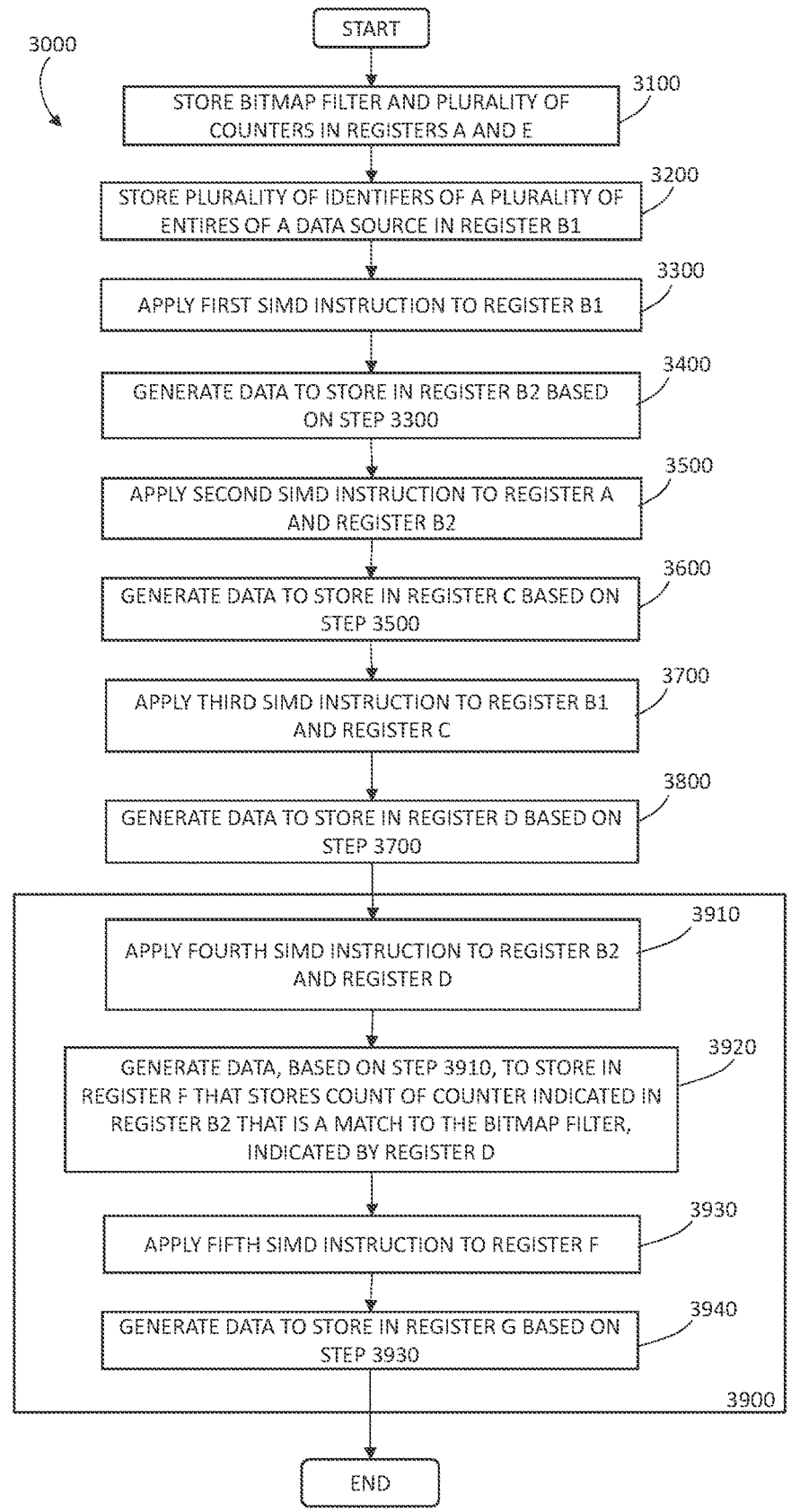
FIG. 19 is a flowchart of a method of implementing a single instruction multiple data implementation, according to an example.

FIG. 19 is a flowchart of a method 3000 of implementing a single instruction multiple data implementation according to the example described with reference to FIGS. 17 and 18.

The method 3000 is described in relation to the example extended bit vector 675 of registers A and E shown in FIG. 18. Registers A and E comprise a) the bitmap filter 670 (described in relation to FIG. 17) in Reg A and b) a plurality of counters, C1-Cn, of bits set in the bitmap filter 670 in Reg E, wherein each bit location of the bitmap filter 670 is associated with one of the plurality of counters, C1-Cn. The method 3000 starts, at block 3100, with storing the bitmap filter 670 and the plurality of counters, C1-Cn, in the registers, Reg A and Reg E, respectively.

Next, the method 3000 proceeds to block 3200 where a plurality of identifiers of a corresponding plurality of entries of a data source are stored in a second register, Reg B1, wherein the integer values of each of the plurality of identifiers is shifted based on a minimum identifier value defined by the bitmap filter 670.

After the step of storing at block 3200, the method 3000 continues to block 3300 where a first single instruction multiple data, SIMD, instruction is applied to the second register, Reg B1. After this, the method 3000 proceeds to block 3400 where, based on the application of the first SIMD instruction, data stored in a third register, Reg B2, is generated, where the third register, Reg B2, comprises a plurality of byte addresses of the bitmap filter (670) corresponding to the second register, Reg B1.

Next, the method 3000 moves to block 3500 where a second SIMD instruction is applied to the first register, Reg A, and the third register, Reg B2. Following block 3500, the method 3000 continues to block 3600 where, based on the second SIMD instruction, data stored in a fourth register, Reg C, is generated wherein the fourth register, Reg C, comprises a version of the first register, Reg A, corresponding to the byte addresses of Reg B2.

Following block 3600, at block 3700 a third SIMD instruction is applied to the second register, Reg B1, and the fourth register, Reg C. Next, at block 3800, based on the third SIMD instruction, data stored in a fifth register, Reg D, is generated wherein the fifth register, Reg D, identifies whether an identifier of the second register, Reg B1, is a match to the bitmap filter (670).

After block 3700, at block 3900, a row location in a data source is identified for each identifier that is a match to the bitmap filter 670. The identification of block 3900 is made up of blocks 3910, 3920, 3920 and 3940. At block 3910, the method 3000 proceeds to application of, a fourth SIMD instruction to the third register, B2, and the fifth register, Reg D.

The method 3000 proceed to block 3920 where, based on the fourth SIMD instruction, data stored in a sixth register, Reg F, is generated, wherein the sixth register Reg F comprises a count of a counter associated with the byte indicated in Reg B2 containing an identifier that is a match to the bitmap filter (670), as indicated in Reg D.

Following block 3920, the method 3000 continues to block 3930 where a fifth SIMD instruction, is applied to the sixth register, Reg F. Following this application, at block 3940, data stored in a seventh register, Reg G, is generated based on the fifth SIMD instruction, where the seventh register, Reg G, comprises row locations for each identifier that is a match to the bitmap filter (670).

In one example, the method 3000 may include an output step where an array representative of the fifth register, Reg D, is output. In another example, the method 3000 may include an output step where an array representative of the seventh register, Reg G, is output.

The SIMD implementation examples of FIGS. 17-19 enable acceleration of database query execution to (1) identify whether an input is represented by a bitmap filter and (2) determine a row location (for example a row identifier) within another data structure for each input matched to the bitmap filter. The identification of (1) and the determination of (2) may be part of a probe phase of a join process.

The examples described within this application provide database query execution logic that generates a bitmap filter, filters a series of input values using the bitmap filter, and determines row identifiers corresponding to matched input values, using reduced computational cycles (for example, reduced time spent evaluating hash functions). The design logic and subsequent generation of the example data structures, such as the described bitmap filters and extended bitmap vectors, allow the data structures to be stored in a cache memory of a computer and, thus, provide fast processing. In addition, the SIMD implementation further reduces computational effort (number of cycles) whilst increasing query execution speed.

Figure 20:
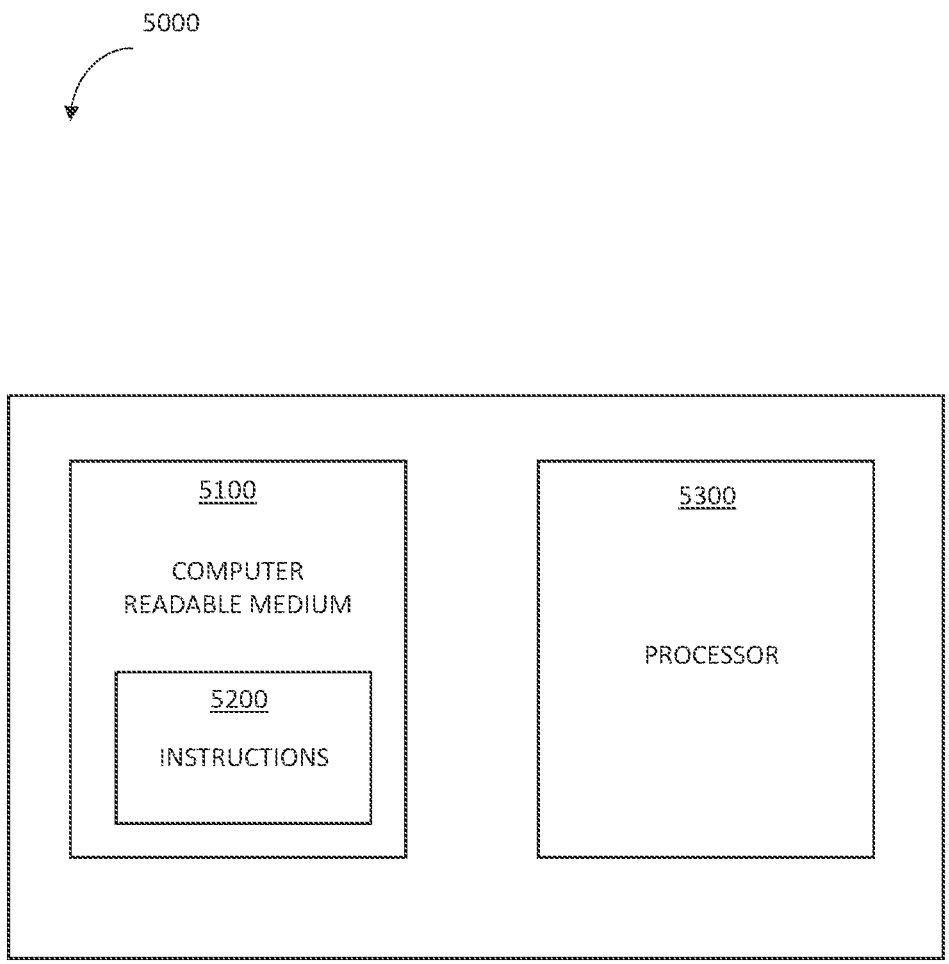
FIG. 20 is a schematic diagram of a device, according to an example.

FIG. 20 is a schematic diagram of an exemplary device 5000 configured with software to perform the functionality described herein. The device 5000 has a computer readable medium 5100 and a processor 5300. The computer readable medium 5100 contains instructions 5200 that, when executed by the processor 5300, cause the processor 5300 to perform one or more of the following, previously described, methods, namely method 400; method 800, method 1000; and method 2000. The processor 5300 may be a type of processor discussed in relation to FIGS. 17, 18, and 19, for example (a) a processor such as Intel Xeon, AMD Opteron, ARM, and similar, with or without SIMD extensions, and (b) any processors with SIMD extensions, such as, but not limited to, Intel AVX-2 and AVX-512 instructions sets. In the preceding description, for purposes of explanation, numerous specific details of certain examples are set forth. Reference in the specification to "an example" or similar language means that a particular feature, structure, or characteristic described in connection with the example is included in at least that one example, but not necessarily in other examples The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

The content of this description contains the following numbered clauses:

1. A computer-implemented method of generating a bitmap filter, the method comprising:
   receiving a filter parameter;
   querying a first data source associated with the filter parameter to identify at least one entry in the first data source with an identifier corresponding to the filter parameter;
   performing a first process, the first process comprising:
      identifying zero or one single bit location, of a plurality of bit locations in a bitmap filter, that corresponds to an identifier of an entry of the first data source corresponding to the filter parameter, wherein each identifier has a numerical value and the bit location is identified based on the numerical value of the corresponding identifier;

assigning the single bit location to the identifier, such that there is one-to-one mapping between each identifier corresponding to the filter parameter and an assigned bit location in the bitmap filter; and setting a bit at the assigned bit location; and repeating the first process for another entry in the first data source with an identifier corresponding to the filter parameter.

2. The computer-implemented method of clause 1, comprising repeating the first process for all the entries of the first data source with identifiers corresponding to the filter parameter such that the bitmap filter comprises:

a set bit assigned to each bit location corresponding to each identifier of an entry of the first data source corresponding to the filter parameter.

3. The computer-implemented method of clause 1, wherein each identifier of a respective said entry of the first data source is a unique integer value.

4. The computer-implemented method of clause 1, wherein identifying a single bit location that corresponds to an identifier of an entry of the first data source corresponding to the filter parameter, comprises applying a function to the numerical value of the identifier, such that execution of the function generates the single bit location directly from the numerical value of the identifier 5. The computer-implemented method of clause 4, wherein execution of the function shifts the numerical value of the identifier by a predetermined amount.

6. The computer-implemented method of clause 4, wherein the first data source comprises a minimum value identifier of an entry of the first data source corresponding to the filter parameter and execution of the function subtracts the minimum value identifier from the numerical value of the identifier.

7. The computer-implemented method of clause 4, wherein execution of the function identifies a byte address of the bitmap filter and a bit address within the identified byte based on the numerical value of the identifier wherein the byte address and the bit address identify the single bit location.

8. The computer-implemented method of clause 1, wherein an identifier of an entry is a primary key of the entry.

9. A computer-implemented method of using a bitmap filter generated by the method of clause 1, the method comprising:

filtering a data source using the bitmap filter, the filtering comprising:

identifying a single bit location, of a plurality of bit locations in the bitmap filter, that corresponds to an identifier of an entry of the data source, wherein each identifier has a numerical value and the bit location is identified based on the numerical value of the corresponding identifier;

assigning the single bit location to the identifier, such that there is one-to-one mapping between each identifier and an assigned bit location in the bitmap filter;

identifying whether a bit at the assigned bit location is set; and outputting the entry of the data source when the bit is set; and repeating the filtering for another entry of the data source.

10. The computer-implemented method of clause 9, wherein the filtering comprises determining that the numerical value of an identifier of an entry of the data source is within an integer range represented by the bitmap filter.

11. The computer-implemented method of clause 9, wherein identifying a single bit location that corresponds to the identifier of an entry of the data source comprises applying a function to the numerical value of the identifier, such that execution of the function generates the single bit location directly from the numerical value of the identifier.

12. The computer-implemented method of clause 11, wherein execution of the function shifts the numerical value of the identifier by a predetermined amount.

13. The computer-implemented method of clause 12, wherein the bitmap filter comprises a minimum bit location representative of a minimum value identifier and execution of the function subtracts the numerical value of the minimum value identifier from the numerical value of the identifier.

14. The computer-implemented method of clause 11, wherein execution of the function identifies a byte address of the bitmap filter and a bit address within the identified byte based on the numerical value of the identifier, wherein the byte address and the bit address identify a single bit location.

15. The computer-implemented method of clause 14, comprising identifying the byte address of the bitmap filter by applying a modulo function to the identifier, whereby to generate a quotient which is the byte number and identifying the bit number within the identified byte by applying a modulo function to the identifier, whereby to generate a remainder which is the bit number.

16. The computer-implemented method of clause 9 wherein each identifier of the data source is a foreign key.

17. The computer-implemented method of clause 9, further comprising outputting an array representative of each entry of the data source that corresponds to a set bit in the bitmap filter.

18. A computer-implemented method of using a bitmap filter generated by the method of clause 1, the method comprising:

associating a set bit of the bitmap filter with an entry of a data source, wherein the set bit is located at a bit location within the bitmap filter;

determining a row identifier of an associated row in another data source based on a sum of a number of bits set in bit locations between the bit location of the set bit associated with the entry of the data source and a bit location in the bitmap filter corresponding to a different, known, row identifier;

interrogating the associated row of the other data source corresponding to the determined row identifier; and outputting information from the associated row of the other data source.

19. The computer-implemented method of clause 18, comprising determining the row identifier of an associated row in the other data source based on a sum of a number of bits set in bit locations preceding the bit location of the set bit associated with the entry of the data source.

20. The computer-implemented method of clause 18, wherein the other data source is an intermediary table comprising a plurality of entries corresponding to a filter parameter.

21. The computer-implemented method of clause 20, wherein the plurality of entries corresponds to set bits in the bitmap filter, each entry is associated with an identifier, and contains information defining the identifier.

22. The computer-implemented method of clause 21, wherein the other data source comprises a plurality of row identifiers, each corresponding to one of the plurality of entries and having a numerical value, the plurality of entries being sorted based on the numerical values of the identifiers, and the plurality of row identifiers increment by 1 for each entry.

23. The computer-implemented method of clause 18, wherein the bit location in the bitmap filter corresponding to the different, known, row identifier is a location corresponding to a minimum bit in the bitmap filter.

24. The computer-implemented method of clause 18, wherein the bit location in the bitmap filter corresponding to the different, known, row identifier is a location corresponding to a maximum bit in the bitmap filter.

25. The computer-implemented method of clause 18, wherein each identifier of the data source is a foreign key.

26. A computer-implemented method of using an extended bit vector comprising a) a bitmap filter configured to implement one-to-one mapping of an identifier of an entry of a data source to a bit location within the bitmap filter and b) a plurality of counters of bits set in the bitmap filter, wherein each bit location of the bitmap filter is associated with one of the plurality of counters, the method comprising:
    associating a set bit of the bitmap filter with an entry of a data source, wherein the set bit is located at a bit location within the bitmap filter;
    determining a row identifier of an associated row in another data source based on a count of a counter associated with the bit location of the set bit, wherein the count of the counter is a sum of a number of set bits in bit locations between the bit location of the set bit associated with the entry of the data source and a bit location in the bitmap filter corresponding to a different, known, row identifier;
    interrogating the associated row of the other data source corresponding to the determined row identifier; and
    importing information from the associated row of the other data source into a result table.

27. The computer-implemented method of clause 26, wherein the counter associated with the bit location of the set bit defines a count of bits set in a first section of the bitmap filter preceding a second section of the bitmap filter comprising the bit location of the set bit.

28. The computer-implemented method of clause 27, comprising determining the row identifier based on a sum of the count of the counter associated with the bit location of the set bit and a number of set bits within the second section of the bitmap filter that precede and include the bit location of the set bit.

29. The computer-implemented method of clause 26, wherein the other data source is an intermediary table comprising a plurality of entries corresponding to a filter parameter.

30. The computer-implemented method of clause 26, wherein the plurality of entries corresponds to set bits in the bitmap filter, each entry is associated with an identifier and contains information defining the identifier.

31. The computer-implemented method of clause 29, wherein the other data source comprises a plurality of row identifiers, each corresponding to one of the plurality of entries, the plurality of entries being sorted in ascending order of identifiers, and the plurality of row identifiers increment by 1 for each entry.

32. The computer-implemented method of clause 26, wherein the bit location in the bitmap filter corresponding to the different, known, row identifier is a location corresponding to a minimum bit in the bitmap filter.

33. The computer-implemented method of clause 26, wherein the bit location in the bitmap filter corresponding to the different, known, row identifier is a location corresponding to a maximum bit in the bitmap filter.

34. The computer-implemented method of clause 26, wherein associating the set bit of the bitmap filter with an entry of a data source comprises:
    identifying a single bit location, of a plurality of bit locations in the bitmap filter, that corresponds to an identifier of an entry of the data source, wherein each identifier has a numerical value and the bit location is identified based on the numerical value of the corresponding identifier_; and
    assigning the single bit location to the identifier, such that there is one-to-one mapping between each identifier and an assigned bit location in the bitmap filter.

35. A computer-implemented method of using an extended bit vector comprising a) a bitmap filter configured to implement one-to-one mapping of an identifier of an entry of a data source to a bit location within the bitmap filter and b) a plurality of counters, C1-Cn, of bits set in the bitmap filter, wherein each bit location of the bitmap filter is associated with one of the plurality of counters, C1-Cn, the method comprising:
    storing the bitmap filter in a first register, Reg E;
    storing a plurality of identifiers of a corresponding plurality of entries of a data source in a second register, Reg B1, wherein the plurality of identifiers is shifted based on a minimum identifier value defined by the bitmap filter;
    applying a first single instruction multiple data, SIMD, instruction to the second register, Reg B1, wherein the first SIMD instruction is applied to all the identifiers stored by the second register;
    generating, based on the application of the first SIMD instruction, a third register, Reg B2, wherein the third register, Reg B2, comprises a plurality of byte addresses of the bitmap filter corresponding to the second register, Reg B1;
    applying, a second SIMD instruction to the first register, Reg E, and the third register, Reg B2, wherein the second SIMD instruction is applied to all the identifiers stored by the first the third register;
    generating, based on the second SIMD instruction, a fourth register, Reg C, wherein the fourth register, Reg C, comprises a version of the first register, Reg E, corresponding to the byte addresses of Reg B2;
    applying, a third SIMD instruction to the second register, Reg B1, and the fourth register, Reg C, wherein the third SIMD instruction is applied to all the identifiers stored by the fourth register;
    generating, based on the third SIMD instruction, a fifth register, Reg D, wherein the fifth register, Reg D, identifies those identifiers of the second register, Reg B1, that are a match to the bitmap filter.

36. The computer implemented method of clause 35, comprising:
    identifying a row location in a data source for each identifier that is a match to the bitmap filter, the identifying comprising:
        applying, a fourth SIMD instruction to the third register, B2, and the fifth register, Reg D, wherein the fourth SIMD instruction is applied to all the identifiers stored by the fifth register;
        generating, based on the fourth SIMD instruction, a sixth register, Reg F, wherein the sixth register Reg F comprises a count of a counter associated with the byte of an identifier that is a match to the bitmap filter, wherein the counter is one of the plurality of counters, C1-Cn, wherein each of the plurality of counters, C1-Cn, comprises a count of set bits and each bit location of the first register, Reg E, that stores the bitmap filter is associated with one of the plurality of counters, C1-Cn;

applying, a fifth SIMD instruction, to the sixth register, Reg F, wherein the fifth SIMD instruction is applied to all the identifiers stored by the sixth register;

generating, based on the fifth SIMD instruction, a seventh register, Reg G, where the seventh register, Reg G, comprises row locations within a data source for those identifiers of the second register, Reg B1, that are a match to the bitmap filter.

37. The computer-implemented method of clause 36, wherein the plurality of counters, C1-Cn, is stored in the first register, Reg E.

38. The computer implemented method of clause 35, comprising: outputting an output array representative of the fifth register, Reg D.

39. The computer implemented method of clause 36, comprising: outputting an output array representative of the seventh register, Reg G.

The invention claimed is:

1. A non-transitory computer readable medium containing instructions, that when executed by a processor, cause the processor to perform a computer-implemented method of using a bitmap filter to filter a data source comprising a plurality of entries as part of a join operation, wherein each entry comprises an identifier and wherein the bitmap filter corresponds to a filter parameter, the method comprising:

associating a set bit of the bitmap filter with an entry of the data source that comprises an identifier that matches the filter parameter, wherein the set bit is located at a bit location within the bitmap filter;

determining a row identifier of row in another data source that corresponds to the identifier based on a sum of a number of bits set in bit locations in the bitmap filter that are between the bit location of the set bit associated with the entry of the data source and a bit location in the bitmap filter corresponding to a different, known, row identifier of a different row in the another data source;

interrogating the row of the another data source corresponding to the determined row identifier to obtain information defining the identifier that matches the filter parameter; and outputting the information from the row of the another data source.

2. The non-transitory computer readable medium computer-implemented method of claim 1, wherein the method further comprises determining the row identifier of the row in the another data source that corresponds to the identifier based on a sum of a number of bits set in bit locations preceding the bit location of the set bit associated with the entry of the data source.

3. The non-transitory computer readable medium of claim 1, wherein the another data source is an intermediary table comprising a plurality of entries corresponding to the filter parameter of the bitmap filter.

4. The non-transitory computer readable medium of claim 3, wherein the plurality of entries corresponds to set bits in the bitmap filter, each entry is associated with an identifier that matches the filter parameter, and contains information defining the identifier.

5. The non-transitory computer readable medium of claim 4, wherein the another data source comprises a plurality of row identifiers, each corresponding to one of the plurality of entries and having a numerical value, the plurality of entries being sorted based on the numerical values of the identifiers, and the plurality of row identifiers increment by 1 for each entry.

6. The non-transitory computer readable medium of claim 1, wherein the bit location in the bitmap filter corresponding to the different, known, row identifier of the different row in the another data source is a location corresponding to a minimum bit in the bitmap filter.

7. The non-transitory computer readable medium of claim 1, wherein the bit location in the bitmap filter corresponding to the different, known, row identifier of the different row in the another data source is a location corresponding to a maximum bit in the bitmap filter.

8. The non-transitory computer readable medium of claim 1, wherein each identifier of an entry of the data source is a foreign key.

9. The non-transitory computer readable medium of claim 1, wherein the bitmap filter is generated as a result of a process comprising the steps of:

receiving a query comprising a filter parameter;

querying a first data source, associated with the filter parameter and comprising a plurality of entries, to identify at least one entry with an identifier corresponding to the filter parameter, wherein each entry of the first data source is identified by a corresponding identifier such that the entries are differentiated from one another;

generating a bitmap filter corresponding to the filter parameter by performing a first process, the first process comprising:

identifying a single bit location, of a plurality of bit locations in a bitmap filter, that corresponds to an identifier of first entry of the first data source corresponding to the filter parameter, wherein the identifier has a numerical value and the bit location is identified based on the numerical value of the identifier;

assigning, in the bitmap filter, the single bit location to the identifier and setting, in the bitmap filter, a bit at the assigned bit location; and repeating the first process for another entry in the first data source with another identifier corresponding to the filter parameter, such that there is one-to-one mapping between each identifier corresponding to the filter parameter and an assigned bit location in the bitmap filter.

10. A non-transitory computer readable medium containing instructions, that when executed by a processor, cause the processor to perform a_computer-implemented method of using an extended bit vector to filter a data source as part of a join operation, wherein the data source comprises a plurality of entries and each entry comprises an identifier and the extended bit vector comprises a) a bitmap filter corresponding to a filter parameter and configured to implement one-to-one mapping of an identifier of an entry of the data source to a bit location within the bitmap filter and b) a plurality of counters of bits set in the bitmap filter, wherein each bit location of the bitmap filter is associated with one of the plurality of counters, the method comprising:

associating a set bit of the bitmap filter with an entry of the data source that comprises an identifier that matches the filter parameter, wherein the set bit is located at a bit location within the bitmap filter;

determining a row identifier of a row in another data source that corresponds to the identifier based on a count of a counter associated with the bit location of the set bit, wherein the count of the counter is a sum of a number of set bits in bit locations in the bitmap filter that are between the bit location of the set bit associated with the entry of the data source and a bit location in the bitmap filter corresponding to a different, known, row identifier of a different row in the another data source;

interrogating the row of the another data source corresponding to the determined row identifier to obtain information defining the identifier that matches the filter parameter; and importing the information from the associated row of the another data source into a result table.

11. The non-transitory computer readable medium of claim 10, wherein the counter associated with the bit location of the set bit defines a count of bits set in a first section of the bitmap filter preceding a second section of the bitmap filter comprising the bit location of the set bit.

12. The non-transitory computer readable medium of claim 11, wherein the method further comprises determining the row identifier based on a sum of the count of the counter associated with the bit location of the set bit and a number of set bits within the second section of the bitmap filter that precede and include the bit location of the set bit.

13. The non-transitory computer readable medium of claim 10, wherein the another data source is an intermediary table comprising a plurality of entries corresponding to the filter parameter of the bitmap filter.

14. The non-transitory computer readable medium of claim 13, wherein the another data source comprises a plurality of row identifiers, each corresponding to one of the plurality of entries, the plurality of entries being sorted in ascending order of identifiers, and the plurality of row identifiers increment by 1 for each entry.

15. The non-transitory computer readable medium of claim 10, wherein the plurality of entries corresponds to set bits in the bitmap filter, each entry is associated with an identifier that matches the filter parameter and contains information defining the identifier.

16. The non-transitory computer readable medium of claim 10, wherein the bit location in the bitmap filter corresponding to the different, known, row identifier of the different row in the another data source is a location corresponding to a minimum bit in the bitmap filter.

17. The non-transitory computer readable medium of claim 10, wherein the bit location in the bitmap filter corresponding to the different, known, row identifier of the different row in the another data source is a location corresponding to a maximum bit in the bitmap filter.

18. The non-transitory computer readable medium of claim 10, wherein the method further comprises:

identifying a single bit location, of a plurality of bit locations in the bitmap filter, that corresponds to the identifier of the entry of the data source, wherein the identifier has a numerical value and the bit location is identified based on the numerical value of the identifier; and assigning the single bit location to the identifier, such that there is one-to-one mapping between the identifier and the assigned bit location in the bitmap filter.

* * * * *